United States Patent [19]

Genrikh et al.

[11] 4,126,792

[45] Nov. 21, 1978

[54] HIGH-VOLTAGE NETWORK FOR AREAS OF INCREASED INTENSITY OF ICING

[76] Inventors: Georgy A. Genrikh, ulitsa Chekistov, 10, kv. 3; Leonid A. Nikonets, ulitsa Khasanskaya, 8, kv. 4; Petr R. Khrusch, ulitsa Pavlika Morozova, 4, kv. 3; Vladimir P. Oleinik, ulitsa Engelsa, 101, kv. 14, all of Lvov; Alexandr A. Neiman, Volgogradsky prospekt, 169, kv. 10, Moscow, all of U.S.S.R.

[21] Appl. No.: 748,537

[22] Filed: Dec. 8, 1976

[51] Int. Cl.² .............................................. H02B 1/00
[52] U.S. Cl. .................... 307/112; 307/147; 219/209; 361/333; 361/333
[58] Field of Search ............... 307/112, 147; 219/209; 343/704; 340/234

[56] References Cited

U.S. PATENT DOCUMENTS

| | | | |
|---|---|---|---|
| 2,240,772 | 5/1941 | Hampe et al. | 307/147 |
| 2,870,311 | 1/1959 | Greenfield et al. | 219/209 X |

FOREIGN PATENT DOCUMENTS

| | | | |
|---|---|---|---|
| 279,736 | 11/1970 | U.S.S.R. | 307/147 |
| 393,702 | 12/1973 | U.S.S.R. | 340/234 |

Primary Examiner—B. Dobeck
Assistant Examiner—Morris Ginsburg
Attorney, Agent, or Firm—Lackenbach, Lilling & Siegel

[57] ABSTRACT

The high-voltage network for areas of increased intensity of icing comprises supply and distribution substations, an overhead transmission line connecting the supply and distribution substations, an additional overhead transmission line leading from the distribution substation, a rectifier for melting the icing with direct current installed at the supply substation, and a switching center positioned at the distribution substation and connecting at least one conductor of the overhead transmission line to a different number of conductors of the additional overhead transmission line when the icing is to be melted on conductors of the additional overhead transmission line by the direct current.

23 Claims, 22 Drawing Figures

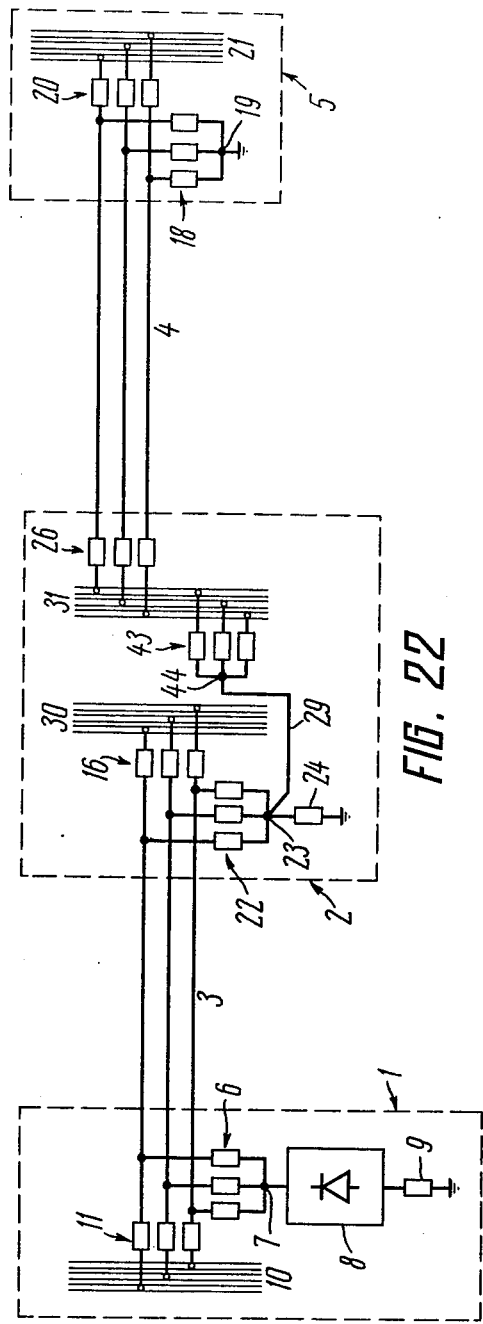

HIGH-VOLTAGE NETWORK FOR AREAS OF INCREASED INTENSITY OF ICING

FIELD OF THE INVENTION

This invention relates to electrical power engineering and, in particular, to a high-voltage network for areas of increased intensity of icing.

BACKGROUND OF THE INVENTION

There is known a high-voltage network for areas of increased intensity of icing, which comprises a supply substation and a distribution substation, an overhead transmission line connecting the supply and distribution substations, an additional overhead transmission line leading from the distribution substation and a rectifier for melting the icing with direct current on the conductors of the overhead transmission line which is positioned at the supply substation, as well as a switching center installed at the distribution substation, which during the operational condition of the high-voltage network connects the overhead transmission line and the additional overhead transmission line to at least one busbar system of the distribution substation.

The shortcoming of the known high-voltage network consists in the fact that the icing is melted only on the conductors of the overhead transmission line connecting the supply and distribution substations. To melt the icing on the conductors of the additional overhead transmission line leading from the distribution substation an additional rectifier for ice melting has to be installed at the distribution substation.

SUMMARY OF THE INVENTION

An object of the invention is to provide a high-voltage network for areas of increased intensity of icing, wherein the icing can be melted not only on the conductors of the overhead transmission line connecting the supply and distribution substations, but also on the conductors of the additional overhead transmission line leading from the distribution substation.

This and other objects of the invention are achieved by a high-voltage network for areas of increased intensity of icing, which comprises a supply substation and a distribution substation connected by an overhead transmission line, an additional overhead transmission line leading from the distribution substation, a rectifier for melting the icing with direct current positioned at the supply substation, a switching center positioned at the distribution station, which during the operational condition of the high-voltage network for areas of increased intensity of icing connects the overhead transmission line and the additional overhead transmission line to at least one busbar system of the distribution substation. This switching center connects, in accordance with the invention, at least one conductor of the overhead transmission line to a different number of conductors of the additional overhead transmission line when the icing is melted by direct current on the conductors of the additional overhead transmission line or when the icing is melted by direct current simultaneously on the conductors of the overhead transmission line and on the conductors of the additional overhead transmission line, the ground being used as a return conductor.

It is advisable that in a high-voltage network the switching center, which during the operating condition of the high-voltage network connects the overhead transmission line and the additional overhead transmission line to the common busbar system of the distribution substation and, when the icing is melted on the conductors of the additional overhead transmission line, connects at least two conductors of the overhead transmission line to one of the conductors of the additional overhead transmission line or three conductors of the overhead transmission line to two of the conductors of the additional overhead transmission line, comprise a three-phase set of switching apparatuses with individually controlled phases, which are at one side connected to the common busbar system and at the other side are joined together in a common point, a single-phase switching apparatus connecting the common point to the ground, a three-phase set of switching apparatuses connecting the overhead transmission line to the common busbar system and a three-phase set of switching apparatuses with individually controlled phases, which connect the additional overhead transmission line to the common busbar system.

It is advisable that in the high-voltage network the switching center, which during the operational condition of the high-voltage network connects the overhead transmission line and the additional overhead transmission line to the common busbar system of the distribution substation and, when the icing is melted on the conductors of the additional overhead transmission line, connects at least two conductors of the overhead transmission line to one of the conductors of the additional overhead transmission line, comprise a three-phase set of switching apparatuses with individually controlled phases, which are at one side connected to the overhead transmission line and at the other side joined together in a common point, a single-phase switching apparatus connecting the common point to the ground, a three-phase set of switching apparatuses with individually controlled phases, which connect the overhead transmission line to the common busbar system, and a three-phase set of switching apparatuses connecting the additional overhead transmission line to the common busbar system.

It is advisable that in the high-voltage network the switching center, which during the operational condition of the high-voltage network connects the overhead transmission line and the additional overhead transmission line to the common busbar system of the distribution substation and, when the icing is melted on the conductors of the additional overhead transmission line, connects at least two conductors of the overhead transmission line to one of the conductors of the additional overhead transmission line or one conductor of the overhead transmission line to at least two of the conductors of the additional overhead transmission line or three conductors of the overhead transmission line to two conductors of the additional overhead transmission line, comprise two three-phase sets of switching apparatuses with individually controlled phases, the switching apparatuses of each set being connected at one side to common points coupled by a single-phase jumper, a single-phase switching apparatus connecting said single-phase jumper to the ground, at the other side the switching apparatuses of one of the three-phase sets of switching apparatuses with individually controlled phases are connected to the overhead transmission line, and the switching apparatuses of the other three-phase set of switching apparatuses with individually controlled phases are connected at the other side to the additional overhead transmission line, a three-phase set of switching apparatuses connecting the overhead transmission line to the common busbar system, and a three-phase set of switching apparatuses connecting the additional overhead transmission line to the common busbar system.

It is advisable that in the high-voltage network the switching center, which during the operational condition of the high-voltage network connects the overhead transmission line and the additional overhead transmission line to different busbar systems of the distribution substation and, when the icing is melted on the conductors of the additional overhead transmission line, connects at least two conductors of the overhead transmission line to one of the conductors of the additional overhead transmission line or one conductor of the overhead transmission line to at least two of the conductors of the additional overhead transmission line or three conductors of the overhead transmission line to two conductors of the additional overhead transmission line, comprise a three-phase set of switching apparatuses connecting the additional overhead transmission line to one system of busbars, two three-phase sets of switching apparatuses with individually controlled phases, the switching apparatuses of each set are connected at one side to common points coupled by a single-phase jumper, a single-phase switching apparatus connecting said single-phase jumper to the ground, at the other side the switching apparatuses of one of the three-phase sets of switching apparatuses with individually controlled phases are connected to the overhead transmission line, and the switching apparatuses of the other three-phase set of switching apparatuses with individually controlled phases are connected at the other side to one system of busbars, a three-phase set of switching apparatuses connecting the overhead transmission line to the other busbar system.

It is advisable that in the high-voltage network the switching center, which during the operational condition of the high-voltage network connects the overhead transmission line and the additional overhead transmission line to different systems of busbars of the distribution substation and, when the icing is melted simultaneously on the conductors of the additional overhead transmission line and on the conductors of the overhead transmission line, connects at least two conductors of the overhead transmission line to one of the conductors of the additional overhead transmission line, comprise a three-phase set of switching apparatuses connecting the additional overhead transmission line to one system of busbars, two three-phase sets of switching apparatuses with individually controlled phases, the switching apparatuses of each set are connected at one side in common points joined together by a single-phase jumper, at the other side the switching apparatuses of one of the three-phase sets of switching apparatuses with individually controlled phases are connected to the overhead transmission line, and the switching apparatuses of the other three-phase set of switching apparatuses with individually controlled phases are connected at the other side to one system of busbars, a three-phase set of switching apparatuses connecting the overhead transmission line to another system of busbars.

It is advisable that in the high-voltage network the switching center, which during the operational condition of the high-voltage network connects the overhead transmission line and the additional overhead transmission line to different systems of busbars of the distribution substation and, when the icing is melted on the conductors of the additional overhead transmission line, connects at least two conductors of the overhead transmission line to three series-connected conductors of the additional overhead transmission line, comprise a three-phase set of switching apparatuses connecting the additional overhead transmission line to one system of busbars, a three-phase set of switching apparatuses with individually controlled phases, which are at one side connected to the overhead transmission line and at the other side are joined in a common point, a single-phase switching apparatus connecting said common point to the ground, a single-phase switching apparatus, one side of which is connected to one of the phases of one of the busbar systems and the other side is connected to the common point by a single-phase jumper, a single-phase switching apparatus connecting the two other phases of one of the busbar systems, and a three-phase set of switching apparatuses connecting the overhead transmission line to another busbar system.

It is advisable that in the high-voltage network the switching center, which during the operational condition of the high-voltage network connects the overhead transmission line and the additional overhead transmission line to the common busbar system of the distribution substation and, when the icing is melted on the conductors of the additional overhead transmission line, connects at least two conductors of the overhead transmission line to three series-connected conductors of the additional overhead transmission line, comprise a three-phase set of switching apparatuses with individually controlled phases, which are at one side connected to the overhead transmission line and at the other side are connected to a common point which is coupled to one of the conductors of the additional overhead transmission line through a single-phase jumper, a single-phase switching apparatus connecting the common point to the ground, a single-phase switching apparatus connecting the two other conductors of the additional overhead transmission line, a three-phase set of switching apparatuses connecting the overhead transmission line to the common busbar system, and a three-phase set of switching apparatuses connecting the additional overhead transmission line to the common busbar system.

It is also advisable that in the high-voltage network the single-phase jumper be connected to one of the conductors of the additional overhead transmission line via a single-phase switching apparatus.

It is advisable that in the high-voltage network the switching center, which during the operational condition of the high-voltage network connects the overhead transmission line and the additional overhead transmission line to different busbar systems of the distribution substation and, when the icing is melted on the conductors of the additional overhead transmission line, connects at least two conductors of the overhead transmission line to three series-connected conductors of the additional overhead transmission line, comprise a three-phase set of switching apparatuses connecting the additional overhead transmission line to one system of busbars, a three-phase set of switching apparatuses with individually controlled phases, which from one side are connected to the overhead transmission line and at the other side are joined in one common point coupled via a single phase jumper to one of the phases of the busbar system to which the additional overhead transmission line is connected, a single-phase switching apparatus connecting said common point to the ground, a single-phase switching apparatus connecting the two other phases of the busbar system, and a three-phase set of switching apparatuses connecting the overhead transmission line to another busbar system.

It is advisable that in the high-voltage network the switching center, which during the operational condition of the high-voltage network for areas of increased intensity of icing connects the overhead transmission line and the additional overhead transmission line to the common system of busbars of the distribution substation and, when the icing is melted on the conductors of the additional overhead transmission line, connects at least two conductors of the overhead transmission line to one of the conductors of the additional overhead transmission line or three conductors of the overhead transmission line to two of the conductors of the additional overhead transmission line, comprise a three-phase set of switching apparatuses with individually controlled phases, which are at one side connected to a common busbar system and at the other side are joined together in a common point, a single-phase switching apparatus connecting the common point to the ground, a three-phase set of switching apparatuses connecting the overhead transmission line to the common busbar system, a three-phase set of switching apparatuses with individually controlled phases, which connect the overhead transmission line to the common busbar system, and a three-phase set of switching apparatuses with individually controlled phases, which on one side are connected to the conductors of the additional overhead transmission line and at the other side are joined together in a common point which is grounded.

It is advisable that in the high-voltage network the switching center, which during the operational condition of the high-voltage network connects the overhead transmission line and the additional overhead transmission line to the common busbar system of the distribution substation and, when the icing is melted on the conductors of the additional overhead transmission line, connects at least two conductors of the overhead transmission line to one of the conductors of the additional overhead transmission line, comprise a three-phase set of switching apparatuses with individually controlled phases, which are connected at one side to the conductors of the overhead transmission line and at the other side are joined to one another in common point, a single-phase switching apparatus coupling said common point to the ground, a three-phase set of switching apparatus es with individually controlled phases, which connect the overhead transmission line to the common busbar system, a three-phase set of switching apparatuses connecting the additional overhead transmission line to the common busbar system, and a three-phase set of switching apparatuses with individually controlled phases, which are at one side connected to conductors of the additional overhead transmission line and at the other side are joined to one another in a common point which is grounded.

It is advisable that in the high-voltage network the switching center, which during the operational condition of the high-voltage network connects the overhead transmission line and the additional overhead transmission line to the common busbar system of the distribution substation and, when the icing is melted on the conductors of the additional overhead transmission line, connects at least two conductors of the overhead transmission line to one of the conductors of the additional overhead transmission line or three conductors of the overhead transmission line to two of the conductors of the additional overhead transmission line or one conductor of the overhead transmission line to two of the conductors of the additional overhead transmission line, comprise two three-phase sets of switching apparatuses with individually controlled phases, the switching apparatuses of each set being joined at one side in common points coupled by a single-phase jumper, a single-phase switching apparatus connecting said single-phase jumper to the ground, at the other side the switching apparatuses of one three-phase set of switching apparatuses with individually controlled phases are connected to the overhead transmission line, and the switching apparatuses of another three-phase set of switching apparatuses with individually controlled phases are at the other side connected to the additional overhead transmission line, a three-phase set of switching apparatuses with individually controlled phases, which are at one side connected to the additional overhead transmission line and at the other side are joined in a common point which is grounded, a three-phase set of switching apparatuses connecting the overhead transmission line to the common busbar system, and a three-phase set of switching apparatuses connecting the additional overhead transmission line to the common busbar system.

It is advisable that in the high-voltage network the switching center, which during the operational condition of the high-voltage network connects the overhead transmission line and the additional overhead transmission line to different systems of busbars at the distribution substation and, when the icing is melted on the conductors of the additional overhead transmission line connects at least two conductors of the overhead transmission line to one of the conductors of the additional overhead transmission line or three conductors of the overhead transmission line to two of the conductors of the additional overhead transmission line or one conductors of the overhead transmission line to two of the conductors of the additional overhead transmission line, comprise a three-phase set of switching apparatuses connecting the additional overhead transmission line to one system of busbars, two three-phase sets of switching apparatuses with individually controlled phases, the switching apparatuses of each of the sets are at one side joined to common points coupled by a single-phase jumper, a single-phase switching apparatus connecting the single-phase jumper to the ground at the other side the switching apparatuses of one three-phase set of switching apparatuses with individually controlled phases are connected to the overhead transmission line, the switching apparatuses of the other three-phase set of switching apparatuses with individually controlled phases are connected at the other side to the first system of busbars, a three-phase set of switching apparatuses with individually controlled phases, which are at one side connected to the additional overhead transmission line and at the other side are joined to one another in a common point which is grounded, a three-phase set of switching apparatuses connecting the overhead transmission line to another system of busbars.

It is advisable that in the high-voltage network the switching center, which during the operational condition of the high-voltage network connects the overhead transmission line and the additional overhead transmission line to the common system of busbars of the distribution substation and, when the icing is melted on the conductors of the additional overhead transmission line, connects three conductors of the overhead transmission line to two of the conductors of the additional overhead transmission line, comprise a three-phase set of switching apparatuses with individually controlled phases, which are at one side connected to the overhead transmission line and at the other side are joined to one another in a common point, a single-phase switching apparatus connecting the common point to the ground, a three-phase set of switching apparatuses connecting the overhead transmission line to the common busbar system, and a three-phase set of switching apparatuses with individually controlled phases, which connect the additional overhead transmission line to the common busbar system.

It is advisable that in the high-voltage network the switching center, which during the operational condition of the high-voltage network connects the overhead transmission line and the additional overhead transmission line to the common busbar system of the distribution substation and, when the icing is melted on the conductors of the additional overhead transmission line, connects three conductors of the overhead transmission line to two of the conductors of the additional overhead transmission line, comprise a three-phase set of switching apparatuses with individually controlled phases, which are at one side connected to the overhead transmission line and at the other side are joined to one another in a common point, a single-phase switching apparatus coupling said common point to the ground, a three-phase set of switching apparatuses connecting the overhead transmission line to the common busbar system, a three-phase set of switching apparatuses with individually controlled phases which connect the additional overhead transmission line to the common busbar system, and a three-phase set of switching apparatuses with individually controlled phases, which are at one side connected to conductors of the additional overhead transmission line and at the other side are joined to one another in a common point which is grounded.

It is advisable that in the high-voltage network the switching center, which during the operational condition of the high-voltage network connects the overhead transmission line and the additional overhead transmission line to the common busbar system of the distribution substation and, when the icing is melted simultaneously on the conductors of the additional overhead transmission line and on the conductors of the overhead transmission line, connects one of the conductors of the overhead transmission line to at least two conductors of the additional overhead transmission line, comprise a three-phase set of switching apparatuses connected on one side to the common bus-bar system and on the other side are joined to one another in a common point, a single-phase switching apparatus coupling said common point to the ground, a three-phase set of switching apparatuses with individually controlled phases, which connect the overhead transmission line to the common busbar system, and a three-phase set of switching apparatuses with individually controlled phases, which connect the additional overhead transmission line to the common busbar system.

It is advisable that in the high-voltage network the switching center, which during the operational condition of the high-voltage network connects the overhead transmission line and the additional overhead transmission line to the common busbar system of the distribution substation and, when the icing is melted simultaneously on the conductors of the additional overhead transmission line and on the conductors of the overhead transmission line, connects one of the conductors of the additional overhead transmission line, comprise a three-phase set of switching apparatuses with individually controlled phases, which are at one side connected to the additional overhead transmission line and at the other side joined to one another in a common point, a three-phase set of switching apparatuses with individually controlled phases, which connect the overhead transmission line to the common busbar system, and a three-phase set of switching apparatuses connecting the additional overhead transmission line to the common busbar system.

It is advisable that in the high-voltage network the switching center, which during the operational condition of the high-voltage network connects the overhead transmission line and the additional overhead transmission line to the common busbar system of the distribution substation and, when the icing is melted simultaneously on the conductors of the additional overhead transmission line and on the conductors of the overhead transmission line, connects one of the conductors of the overhead transmission line to two of the conductors of the additional overhead transmission line, comprise two three-phase sets of switching apparatuses with individually controlled phases, the switching apparatuses of each set being at one side connected to the additional overhead transmission line and at the other side joined to one another in common points, one of said common points being grounded, a three-phase set of switching apparatuses with individually controlled phases, which connect the overhead transmission line to the common busbar system, and a three-phase set of switching apparatuses connecting the additional overhead transmission line to the common busbar system.

It is advisable that in the high-voltage network the switching center, which during the operational condition of the high-voltage network connects the overhead transmission line and the additional overhead transmission line to the common busbar system of the distribution substation and, when the icing is melted on the conductors of the additional overhead transmission line, connects two conductors of the overhead transmission line to three conductors of the additional overhead transmission line, comprise a three-phase set of switching apparatuses, which are at one side connected to the common busbar system and at the other side are joined to one another in a common point, a single-phase switching apparatus coupling said common point to the ground, a three-phase set of switching apparatuses with individually controlled phases, which connect the overhead transmission line to the common busbar system, and a three-phase set of switching apparatuses connecting the additional overhead transmission line to the common system of busbars.

It is advisable that in the high-voltage network the switching center, which during the operational condition of the high-voltage network connects the overhead transmission line and the additional overhead transmission line to the common system of busbars of the distribution substation and, when the icing is melted simultaneously on the conductors of the additional overhead transmission line and on the conductors of the overhead transmission line, connects two conductors of the overhead transmission line to three conductors of the additional overhead transmission line, comprise a three-phase set of switching apparatuses which are at one side connected to the additional overhead transmission line and at the other side are joined to one another in a common point, a three-phase set of switching apparatuses with individually controlled phases, which connect the overhead transmission line to the common busbar system, and a three-phase set of switching apparatuses connecting the additional overhead transmission line to the common busbar system.

It is advisable that in the high-voltage network the switching center, which during the operational conditions of the high-voltage network connect the overhead transmission line and the additional overhead transmission line to the common busbar system and, when the icing is melted on the conductors of the additional overhead transmission line, connects two conductors of the overhead transmission line to three conductors of the additional overhead transmission line, comprise a three-phase set of switching apparatuses with individually controlled phases which are at one side connected to the overhead transmission line and at the other side are joined in one common point, a three-phase set of switching apparatuses connected at one side to the additional overhead transmission line and at the other side are joined in one common point, a single-phase jumper coupling said common points, a single-phase switching apparatus connecting said single-phase jumper to the ground, a three-phase set of switching apparatuses connecting the overhead transmission line to the common busbar system, and a three-phase set of switching apparatuses connecting the additional overhead transmission line to the common busbar system.

It is advisable that in the high-voltage network the switching center, which during the operational condition of the high-voltage network connects the overhead transmission line and the additional overhead transmission line to different systems of busbars of the distribution substation and, when the icing is melted on the conductors of the additional overhead transmission line, connects two of the conductors of the overhead transmission line to three conductors of the additional overhead transmission line, comprise a three-phase set of switching apparatuses connecting the additional overhead transmission line to one system of busbars, a three-phase set of switching apparatuses connected at one side to the first system of busbars and at the other side joined to one another in one common point, a three-phase set of switching apparatuses with individually controlled phases which are at one side connected to the overhead transmission line and at the other side are joined to one another in a common point, a single-phase jumper coupling the common points, a single-phase switching apparatus connecting said single-phase jumper to the ground, and a three-phase set of switching apparatuses connecting the overhead transmission line to a second system of busbars.

Other objects and advantages of this invention will become apparent from the following description of its embodiments taken together with the accompanying drawings in which:

FIG. 1 shows a high-voltage network for areas of increased intensity of icing, wherein the switching center, when the icing is melted, connects at least two conductors of the overhead transmission line to one of the conductors of the additional overhead transmission line or three conductors of the overhead transmission line to two conductors of the additional overhead transmission line, according to the invention;

FIG. 2 shows a high-voltage network for areas of increased intensity of icing, wherein the switching center, when the icing is melted, connects two or three conductors of the overhead transmission line to one of the conductors of the additional overhead transmission line, according to the invention;

FIGS. 3 and 4 show embodiments of a high-voltage network for areas of increased intensity of icing, wherein the switching center, when the icing is melted, connects at least two conductors of the overhead transmission line to one of the conductors of the additional overhead transmission line or three conductors of the overhead transmission line to two conductors of the additional overhead transmission line or one conductor of the overhead transmission line to at least two conductors of the additional overhead transmission line, according to the invention;

FIGS. 5 through 9 show embodiments of a high-voltage network for areas of increased intensity of icing, wherein the switching center, when the icing is melted, connects at least two conductors of the overhead transmission line to one conductor of the additional overhead transmission line, according to the invention;

FIG. 10 shows a high-voltage network for areas of increased intensity of icing, wherein the switching center, when the icing is melted, connects at least two conductors of the overhead transmission line to one of the conductors of the additional overhead transmission line or three conductors of the overhead transmission line to two conductors of the additional overhead transmission line, according to the invention;

FIG. 11 shows a high-voltage network for areas of increased intensity of icing, wherein the switching point, when the icing is melted, connects two or three conductors of the overhead transmission line to one conductor of the additional overhead transmission line, according to the invention.

FIGS. 12 and 13 show embodiments of a high-voltage network for areas of increased intensity of icing, wherein the switching center, when the icing is melted, connects at least two conductors of the overhead transmission line to one of the conductors of the additional overhead transmission line or three conductors of the overhead transmission line to two conductors of the additional overhead transmission line or one conductor of the overhead transmission line to two conductors of the additional overhead transmission line, according to the invention;

Figure 18:
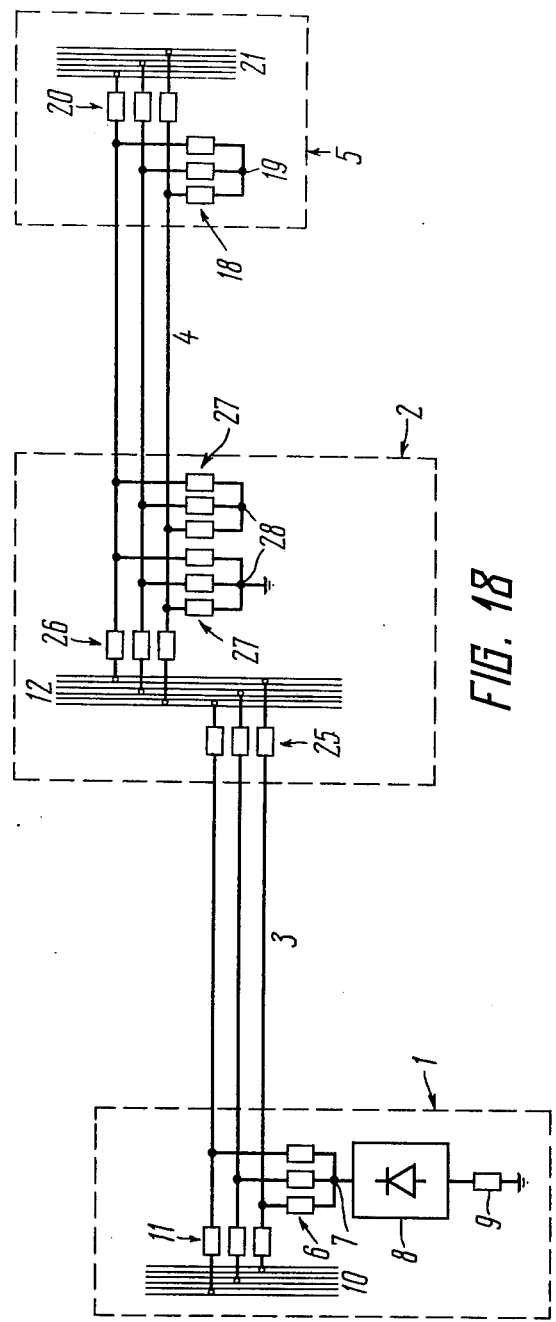

FIG. 18 shows a high-voltage network for areas of increased intensity of icing, wherein the switching ccenter, when the icing is melted, connects one of the conductors of the overhead transmission line to two conductors of the additional overhead transmission line, according to the invention; and FIGS. 19 through 22 show embodiments of a high-voltage network for areas of increased intensity of icing, wherein the switching center, when the icing is melted, connects two conductors of the overhead transmission line to three conductors of the additional overhead transmission line, according to the invention.

DETAILED DESCRIPTION OF THE INVENTION

A high-voltage network for areas of increased intensity of icing comprises a supply substation 1 (FIG. 1), a distribution substation 2, a three-wire overhead transmission line 3 connecting the supply substation 1 and the distribution substation 2, and an additional three-wire overhead transmission line 4 connecting the distribution substation 2 to a receiving substation 5. The supply substation 1 is equipped with a three-phase set 6 of switching apparatuses which are at one side connected to the overhead transmission line 3 and at the other side are joined to one another in a common point 7, a rectifier 8 for melting of the icing with direct current on the conductors of the overhead transmission line 3 and the additional overhead transmission line 4, one of the poles of said rectifier 8 being connected to the common point 7, a single-phase switching apparatus 9 connecting the other pole of rectifier 8 to the ground, a busbar system 10 and a three-phase set 11 of switching apparatuses connecting the overhead transmission line 3 to the busbar system 10 of the supply substation 1.

The overhead transmission line 3 and the additional overhead transmission line 4 are connected to a common system of busbars 12 of the distribution substation 2. The switching center installed at the distribution substation 2 comprises a three-phase set 13 of switching apparatuses with individually controlled phases, which are on one side connected to the common system of busbars 12 and on the other side are joined together in a common point 14, a single-phase switching apparatus 15 connecting the common point 14 to the ground, a three-phase set 16 of switching apparatuses connecting the overhead transmission line 3 to the common system of busbars 12 and a three-phase set 17 of switching apparatuses with individually controlled phases, which connect the additional overhead transmission line 4 to the common system of busbars 12. The receiving substation 5 is equipped with a three-phase set 18 of switching apparatuses connected on one side to the overhead transmission line 4 and on the other side joined together in a common point 19 which is grounded, and a three-phase set 20 of switching apparatuses connecting the additional overhead transmission line 4 to a system of busbars 21 of the receiving substation 5.

Circuit-breakers with disconnecting switches or isolating switches can be employed as the three-phase sets 11, 16, 17 and 20 of switching apparatuses. It is preferable that disconnecting switches be used as the three-phase sets 6, 13, 18 of switching apparatuses and single-phase switching apparatuses 9 and 15.

In a high-voltage network for areas of increased intensity of icing the switching center installed at the distribution substation 2 (FIG. 2) comprises a three-phase set 22 of switching apparatuses with individually controlled phases, which are on one side connected to the overhead transmission line 3 and on the other side are joined together in a common point 23, a single-phase switching apparatus 24 connecting the common point 23 to the ground, a three-phase set 25 of switching apparatuses with individually controlled phases, which connect the overhead transmission line 3 to the common system of busbars 12, and a three-phase set 26 of switching apparatuses connecting the additional overhead transmission line 4 to the common system of busbars 12. Disconnectors are employed as the three-phase set 22 of switching apparatuses with individually controlled phases and the single-phase switching apparatus 24.

Figure 3:
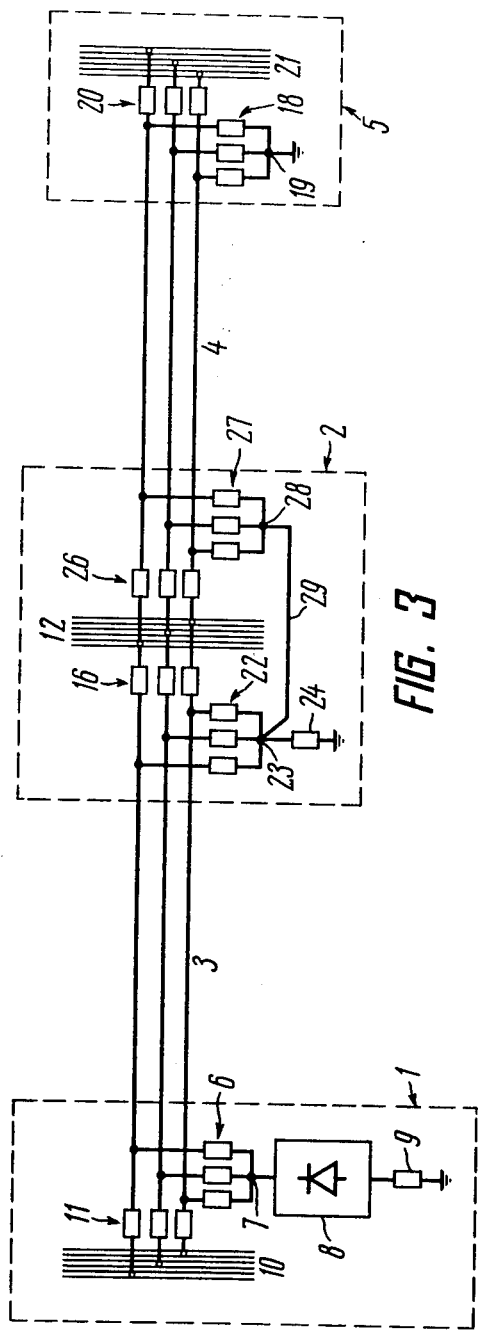

A high-voltage network for areas of increased intensity of icing featuring another embodiment of a switching center is illustrated in FIG. 3. The switching center comprises a three-phase set 22 of switching apparatuses with individually controlled phases, which are on one side connected to the overhead transmission line 3 and on the other side are joined together in a common point 23, a three-phase set 27 of switching apparatuses with individually controlled phases which are on one side connected to the additional overhead transmission line 4 and on the other side are joined to one another in a common point 28, a single-phase jumper 29 connecting the common points 23 and 28, a single-phase switching apparatus 24 connecting the common point 23 to the ground, a three-phase set 16 of switching apparatuses connecting the overhead transmission line 3 to the common system of busbars 12 and a three-phase set 26 of switching apparatuses connecting the additional overhead transmission line 4 to the common system of busbars 12. The single-phase jumper 29 is provided with insulation rated for the voltage of the rectifier 8.

The switching center of the high-voltage network for areas of increased intensity of icing, wherein the overhead transmission line 3 (FIG. 4) and the additional transmission line 4 are connected to different systems of busbars 30 and 31 of the distribution substation 2 respectively, comprises a three-phase set 26 of switching apparatuses connecting the additional overhead transmission line 4 to the system of busbars 31, a three-phase set 32 of switching apparatuses with individually controlled phases, which are on one side connected to the busbar system 31 and on the other side are joined together in a common point 33, a three-phase set 22 of switching apparatuses with individually controlled phases, which are on one side connected to the overhead transmission line 3 and on the other side are joined together in a common point 23, a single-phase jumper 29 connecting the common points 23 and 33, a single-phase switching apparatus 24 connecting the common point 23 to the ground, and a three-phase set 16 of switching apparatuses connecting the overhead transmission line 3 to the busbar system 30.

Another embodiment of a switching center of a high-voltage network for areas of increased intensity of icing, wherein the overhead transmission line 3 (FIG. 5) and the additional overhead transmission line 4 are connected to different busbar systems 30 and 31 of the distribution substation 2 respectively, comprises a three-phase set 26 of switching apparatuses connecting the additional overhead transmission line 4 to a busbar system 31, a three-phase set 22 of switching apparatuses with individually controlled phases, which are on one side connected to the overhead transmission line 3 and on the other side are joined together in a common point 23, a three-phase set 16 of switching apparatuses connecting the overhead transmission line 3 to a busbar system 30, a three-phase set 32 of switching apparatuses with individually controlled phases, which are on one side connected to the busbar system 31 and on the other side are connected to a common point 33, and a single-phase jumper 29 connecting the common points 23 and 33.

Another embodiment of a switching center of a high-voltage network for areas of increased intensity of icing, wherein the overhead transmission line 3 (FIG. 6) and the additional overhead transmission line 4 are connected to different busbar systems 30 and 31 of the distribution substation 2 respectively, comprises a three-phase set 26 of switching apparatuses connecting the additional overhead transmission line 4 to the busbar system 31, a three-phase set 22 of switching apparatuses with individually controlled phases which are on one side connected to the overhead transmission line 3 and on the other side are joined together in a common point 23, a single-phase switching apparatus 24 connecting the common point 23 to the ground, a single-phase switching apparatus 34, one side of which being connected to one of the phases of the busbar system 31 and the other side of which being connected to the common point 23 by means of a single-phase jumper 29, a single-phase switching apparatus 35 connecting the two other phases of the busbar system 31, and a three-phase set 16 of switching apparatuses connecting the overhead transmission line 3 to the busbar system 30. The additional overhead transmission line 4 is connected to the busbar system 21 of the receiving substation 5 by means of a three-phase set 20 of switching apparatuses. The receiving substation 5 is also equipped with a single-phase switching apparatus 36 connecting the conductor of the additional overhead transmission line 4, which at the distribution substation 2 is connected to the phase of the busbar system 31 to which the single-phase switching apparatus 35 is connected, to the ground, and a single-phase switching apparatus 37 which connects to one another two other conductors of the additional overhead transmission line 4.

Figure 7:
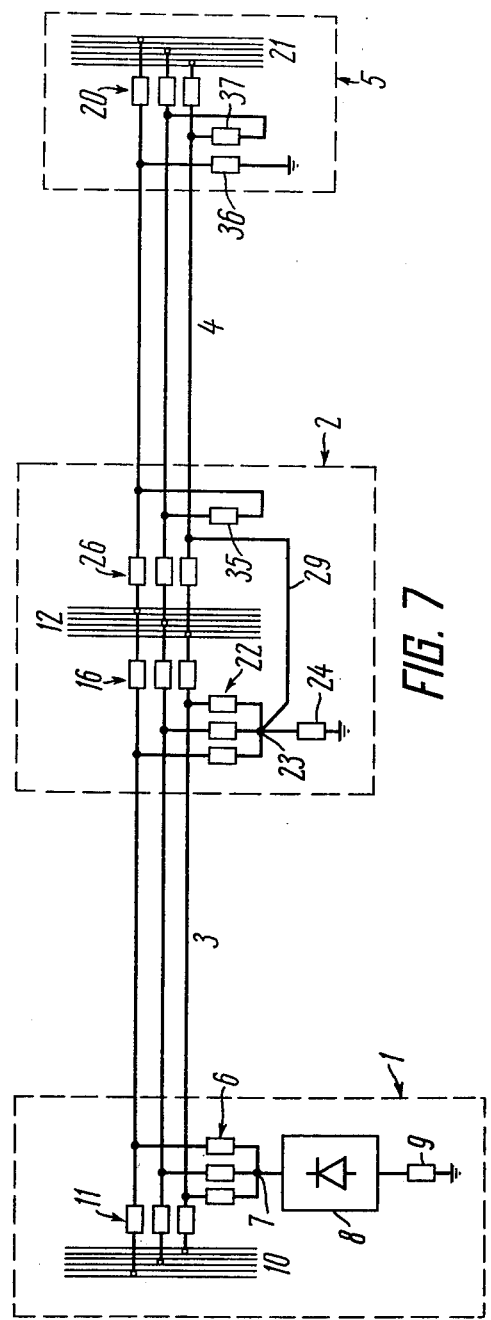

Still another embodiment of a switching center of a high-voltage network for areas of increased intensity of icing is illustrated in FIG. 7. The switching center installed at the distribution substation 2 comprises a three-phase set 22 of switching apparatuses with individually controlled phases, which are on one side connected to the overhead transmission line 3 and on the other side are joined together in a common point 23, a single-phase switching apparatus 24 connecting the common point 23 to the ground, a single-phase jumper 29 connecting the common point 23 to one of the conductors of the additional overhead transmission line 4, a single-phase switching apparatus 35 to link together the two other conductors of the additional overhead transmission line 4, two three-phase sets 16 and 26 of switching apparatuses connecting the overhead transmission line 3 and the additional overhead transmission line 4 to a common busbar system 12. The additional overhead transmission line 4 is joined to the busbar system 21 of the receiving substation 5 by means of a three-phase set 20 of switching apparatuses. The receiving substation 5 also houses a single-phase switching apparatus 36 connecting one of the conductors of the additional overhead transmission line 4, to which at the distribution substation 2 the single-phase switching apparatus 33 is connected, to the ground and a single-phase switching apparatus 37 to join together the two other conductors of the additional overhead transmission line 4. The insulation of the single-phase jumper 29 is rated for the voltage of the additional overhead transmission line 4.

Figure 8:
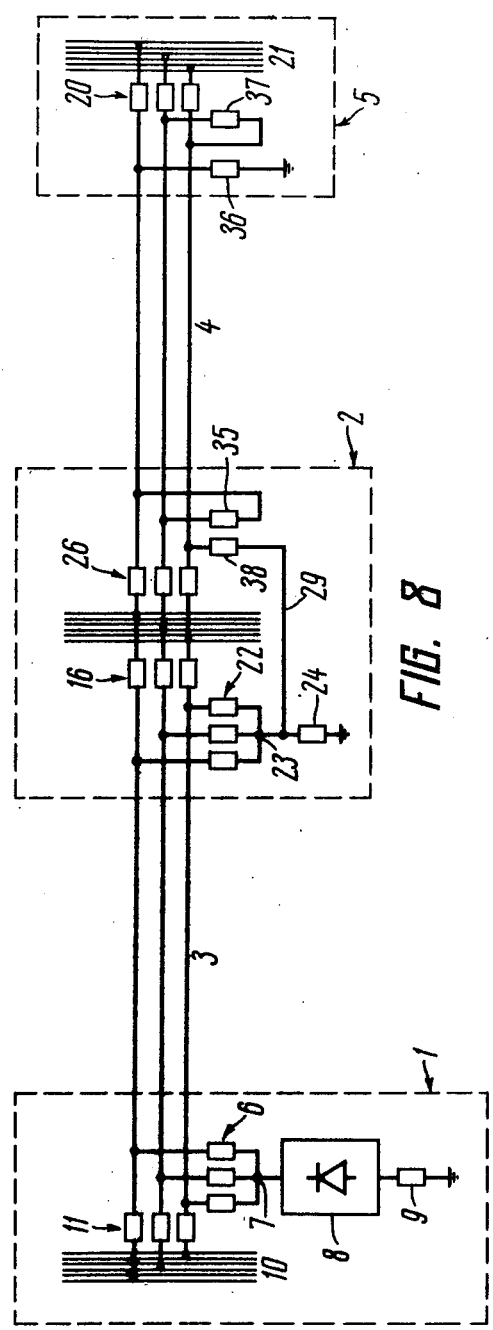

The switching center of the high-voltage network for areas of increased intensity of icing as embodied in FIG. 8 and in distinction to the switching center of the high-voltage network for areas of increased intensity of icing as embodied in FIG. 7 features a single-phase jumper 29 which connects the common point 23 to one of the conductors of the additional overhead transmission line 4 via a single-phase switching apparatus 38 and its insulation is rated for the voltage of the rectifier 8.

Figure 6:
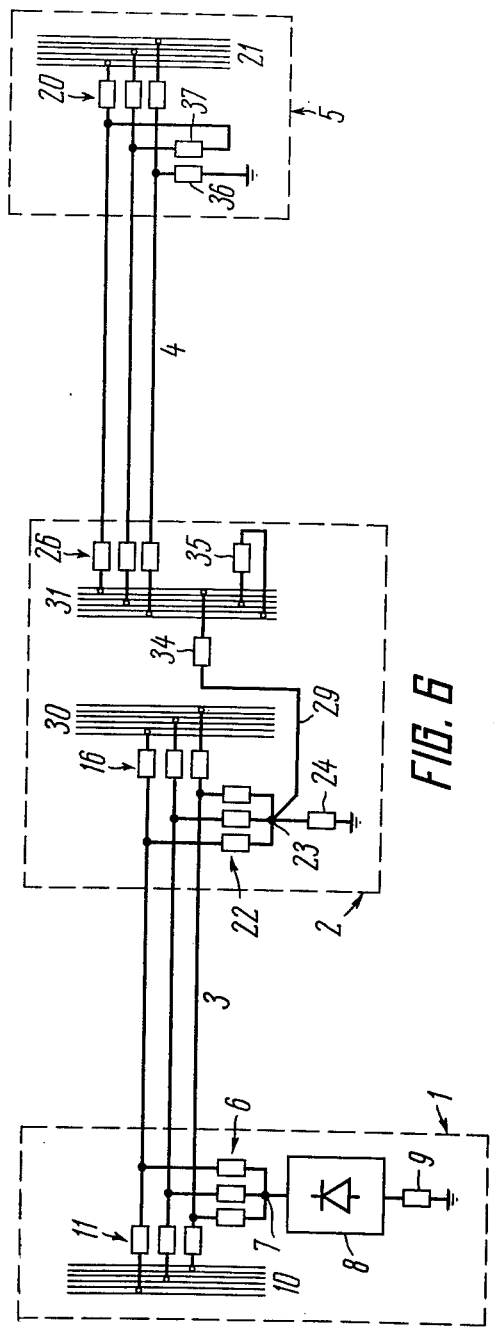
Figure 9:
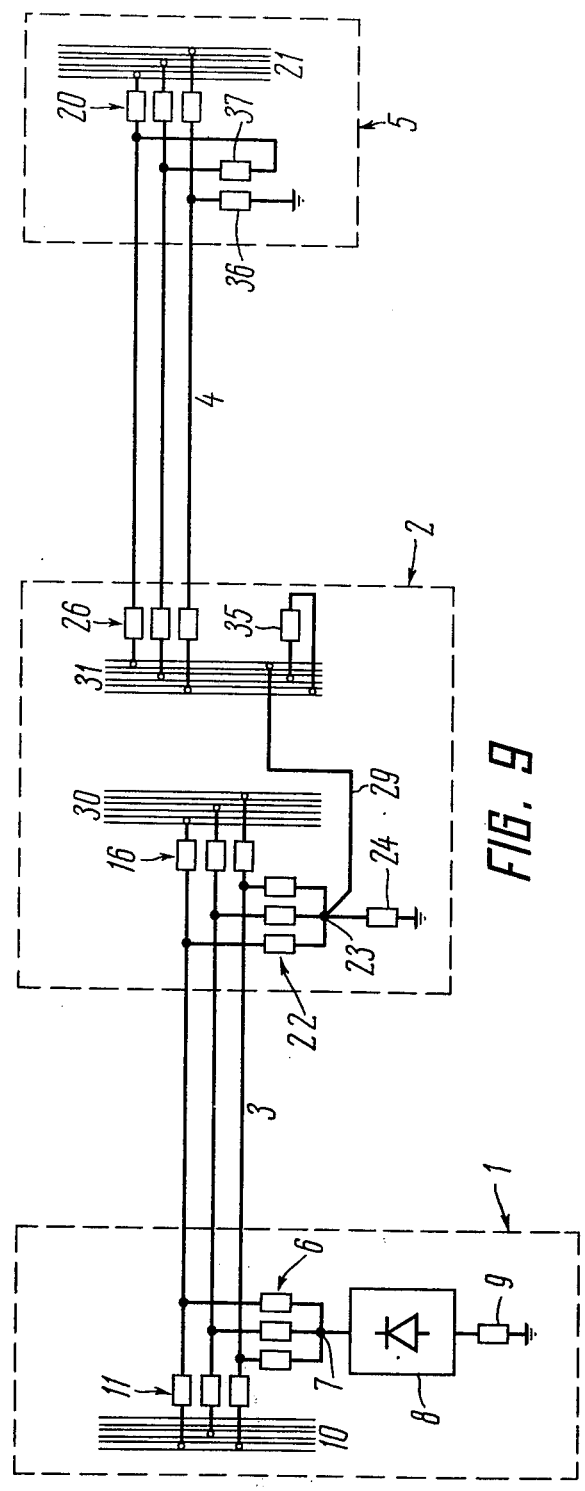

The switching center of the high-voltage network for areas of increased intensity of icing embodied as in FIG. 9 in distinction to the switching center of the high-voltage network for areas of increased intensity of icing embodied as in FIG. 6 features a single-phase jumper 29 (FIG. 9) which connects the common point 23 directly to one of the phases of the busbar system 31 of the distribution substation 2 and its insulation is rated for the voltage of the additional overhead transmission line 4.

Figure 10:
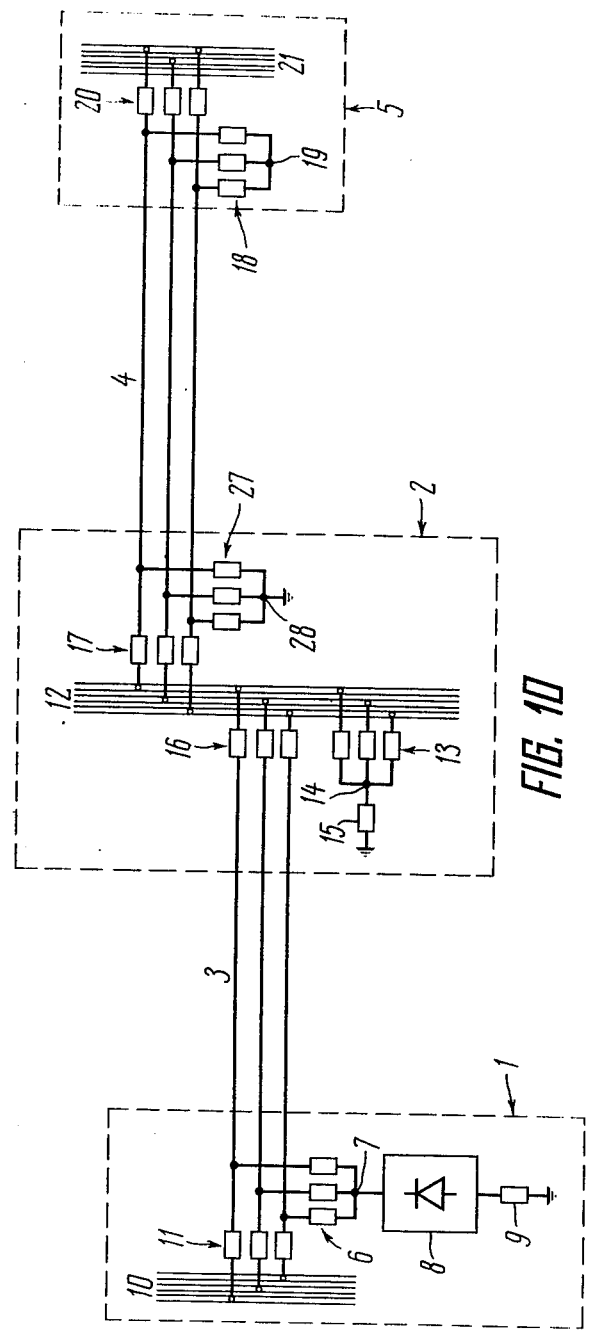

Yet another embodiment of a switching center of a high-voltage network, wherein the overhead transmission line 3 and the additional overhead transmission line 4 are coupled to a common busbar system 12, is shown in FIG. 10. The switching center installed at the distribution substation 2 comprises a three-phase set 13 of switching apparatuses with individually controlled phases, which are on one side connected to the common busbar system 12 and on the other side are joined together in a common point 14, a single-phase switching apparatus 15 connecting the common point 14 to the ground, a three-phase set 16 of switching apparatuses connecting the overhead transmission line 3 to the common busbar system 12, a three-phase 17 of switching apparatuses with individually controlled phases, which connect the additional overhead transmission line 4 to th common busbar system 12 and a three-phase set 27 of switching apparatuses with individually controlled phases, which are on one side connected to the additional overhead transmission line 4 and on the other side are joined together in a common point 28 which is grounded. The receiving substation 5 is equipped with a three-phase set 18 of switching apparatuses connected on one side to the additional overhead transmission line 4 and on the other side joined together in a common point 19 and a three-phase set 20 of switching apparatuses connecting the additional overhead transmission line 4 to the busbar systm 21.

The switching center installed at the distribution substation 2 (FIG. 11) of a high-voltage network for areas of increased intensity of icing comprises a three-phase set 22 of switching apparatuses with individually controlled phases, which are on one side connected to the overhead transmission line 3 and 1 on the other side are joined together in a common point 23, a single-phase switching apparatus 24 connecting the common point 23 to the ground, a three-phase set 25 of switching apparatuses with individually controlled phases which connect the overhead transmission line 3 to the common busbar system 12, a three-phase set 26 of switching apparatuses connecting the additional overhead transmission line 4 to the common busbar system 12, and a three-phase set 27 of switching apparatuses with individually controlled phases, which on one side are connected to the additional overhead transmission line 4 and on the other side are joined together in a common point 28 which is grounded. The receiving substation 5 is made similarly to that shown in FIG. 10.

Figure 12:
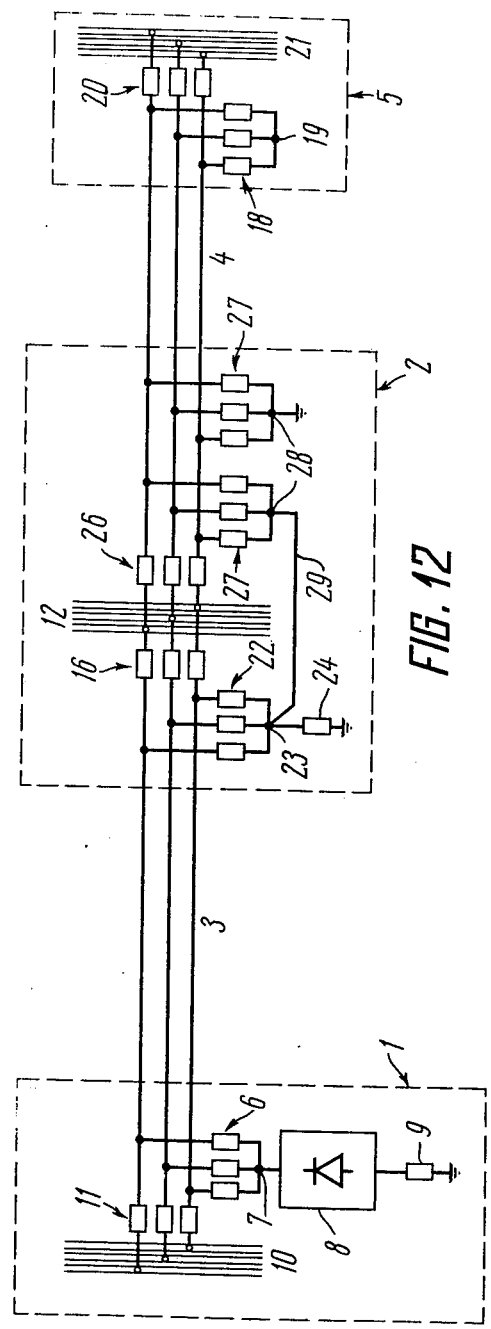

A high-voltage network for areas of increased intensity of icing featuring another embodiment of a switching center is illustrated in FIG. 12. The switching center comprises a three-phase set 22 of switching apparatuses with individually controlled phases, which are on one side connected to the overhead transmission line 3 and on the other side are joined together in a common point 23, a three-phase set 27 of switching apparatuses with individually controlled phases, which are on one side connected to the additional overhead transmission line 4 and on the other side are joined together in a common point 28, a single-phase jumper 29 coupling these common points 23 and 28, a single-phase switching apparatus 24 connecting the common point 23 to the ground, an additional three-phase set 27 of switching apparatuses with individually controlled phases, which are on one side connected to the conductors of the additional overhead transmission line 4 and on the other side are joined together in the common point 28 which is grounded, a three-phase set 16 of switching apparatuses connecting the overhead transmission line 3 to a common busbar system 12, and a three-phase set 26 of switching apparatuses connecting the additional overhead transmission line 4 to the common busbar system 12.

Figure 13:
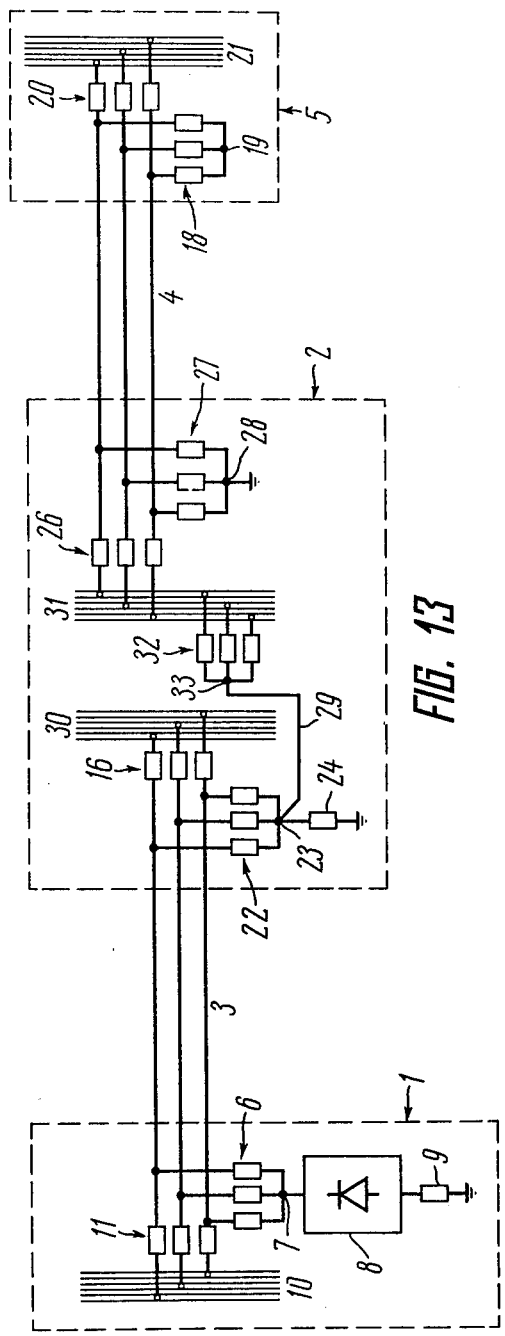

A high-voltage network for areas of increased intensity of icing featuring another embodiment of a switching center is illustrated in FIG. 13. The switching center comprises a three-phase set 16 of switching apparatuses connecting the overhead transmission line 3 to a busbar system 30, a three-phase set 26 of switching apparatuses connecting the additional overhead transmission line 4 to a busbar system 31, a three-phase set 22 of switching apparatuses with individually controlled phases, which are on one side connected to the overhead transmission line 3 and on the other side are joined together in a common point 23, a three-phase set 32 of switching apparatuses with individually controlled phases, which are on one side connected to the busbar system 31 and on the other side are joined together in a common point 33, a single-phase jumper 29 coupling the common points 23 and 33, a three-phase set 27 of switching apparatuses with individually controlled phases, which are on one side connected to the additional overhead transmission line 4 and on the other side are joined together in a common point 28 which is grounded. The receiving substation is made similar to that shown in FIG. 10.

The switching center installed at the distribution substation 2 (FIG. 14) of a high-voltage network for areas of increased intensity of icing comprises a three-phase set 22 of switching apparatuses with individually controlled phases which are on one side connected to the overhead transmission line 3 and on the other side are joined together in a common point 23, a single-phase switching apparatus 24 coupling the common point 23 to the ground, a three-phase set 16 of switching apparatuses connecting the overhead transmission line 3 to a common busbar system 12, a three-phase set 17 of switching apparatuses with individually controlled phases, which connect the additional overhead transmission line 4 to the common busbar system 12. The receiving substation 5 is equipped with a three-phase set 18 of switching apparatuses connected on one side to the additional overhead transmission line 4 and on the other side joined together in a common point 19 which is grounded and a three-phase set 20 of switching apparatuses connecting the additional overhead transmission line 4 to a busbar system 21 of the receiving substation 5.

Figure 11:
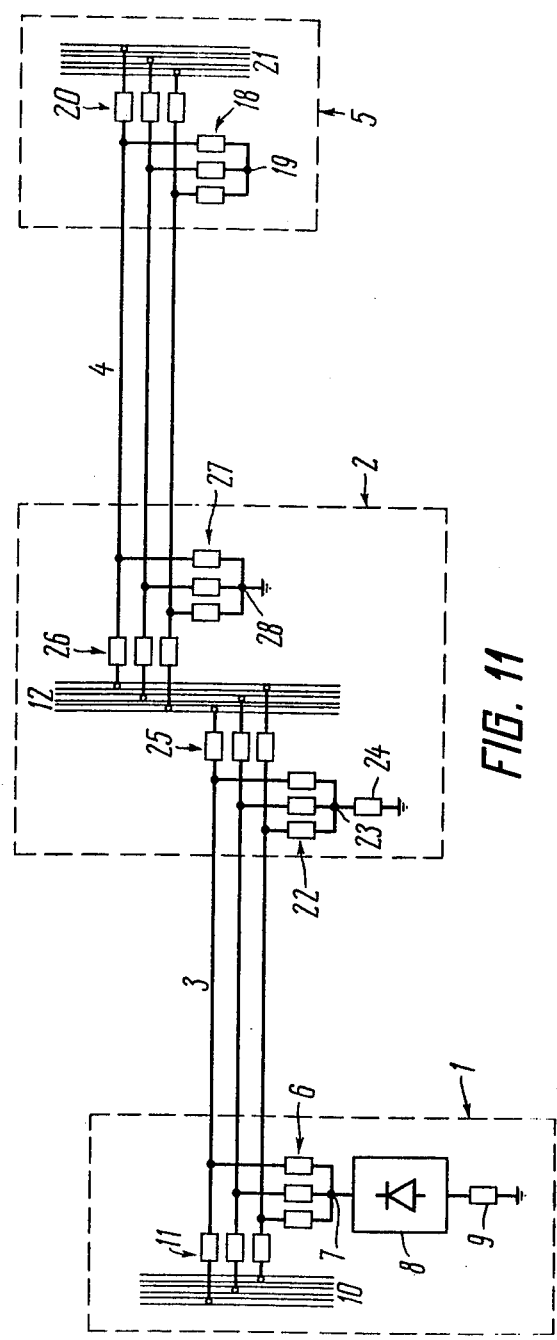
Figure 15:
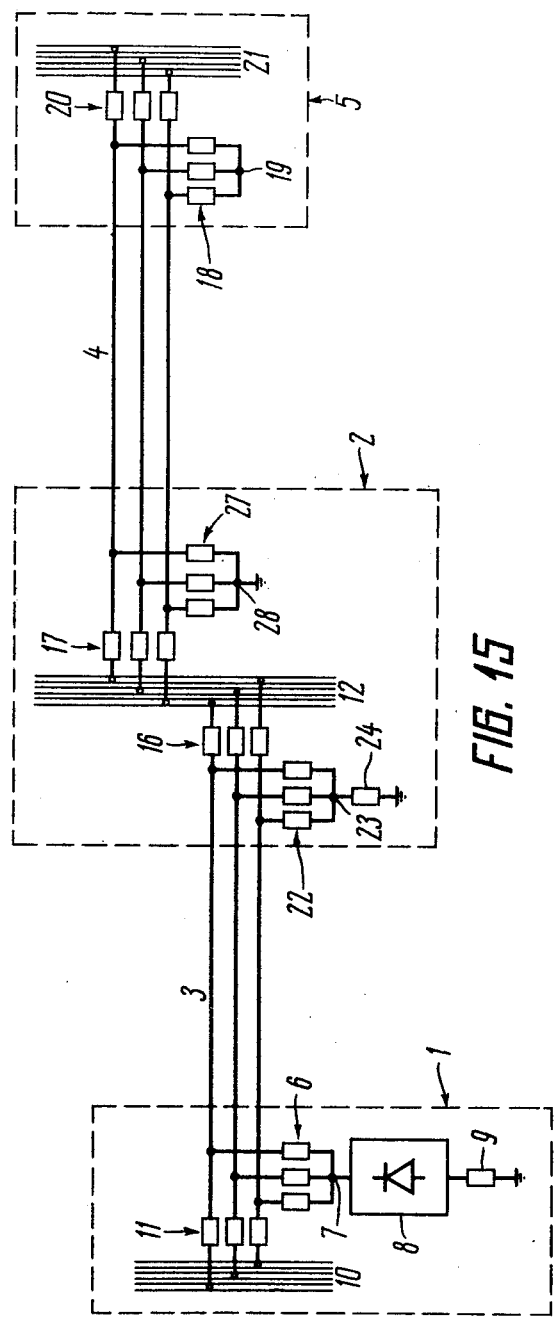

The high-voltage network for areas of increased intensity of icing of FIG. 15 in distinction to the high-voltage network for areas of increased intensity of icing of FIG. 11 is equipped with a three-phase set 16 of switching apparatuses instead of the three-phase set 25 of switching apparatuses with individually controlled phases and a three-phase set 17 of switching apparatuses with individually controlled phases instead of the three-phase set 26 of switching apparatuses.

The switching center of the high-voltage network for areas of increased intensity of icing, wherein the overhead transmission line 3 (FIG. 16) and the additional overhead transmission line 4 are connected to the common busbar system 12 of the distribution substation 2, comprises a three-phase set 39 of switching apparatuses connected on one side to the common busbar system 12 and on the other side joined together in a common point 40, a single-phase switching apparatus 15 connecting the common point 40 to the ground, a three-phase set 25 of switching apparatuses with individually controlled phases, which connect the overhead transmission line 3 to the common busbar system 12, and a three-phase set 17 of switching apparatuses with individually controlled phases, which connect the additional overhead transmission line 4 to the common busbar system 12. The receiving substation is made similarly to that shown of FIG. 14.

Figure 17:
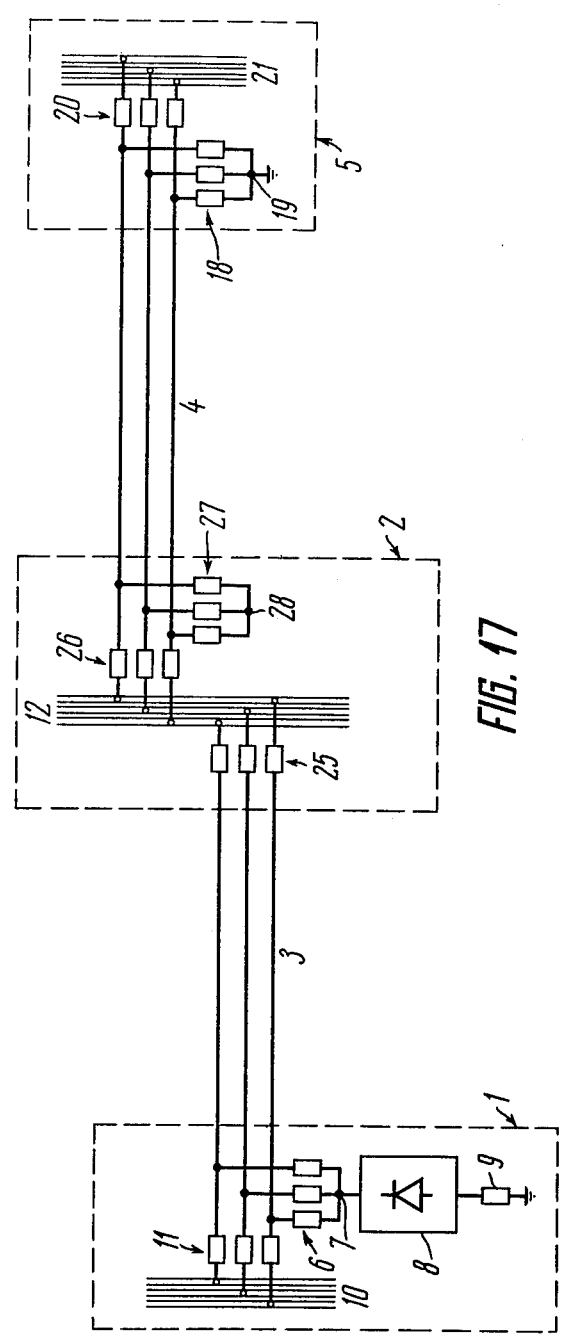

A high-voltage network for areas of increased intensity of icing featuring another embodiment of a switching center is illustrated in FIG. 17. The switching center comprises a three-phase set 27 of switching apparatuses with individually controlled phases, which are on one side connected to the additional overhead transmission line and on the other side are joined together in a common point 28, a three-phase set 25 of switching apparatuses with individually controlled phases, which connect the overhead transmission line 3 to the common busbar system 12, and a three-phase set 26 of switching apparatuses connecting the additional overhead transmission line 4 to the common busbar system 12.

A high-voltage network for areas of increased intensity of icing featuring another embodiment of a switching center is illustrated in FIG. 18. The switching center installed at the distribution substation 2 comprises two three-phase sets 27 of switching apparatuses with individually controlled phases, the switching apparatuses of each set being connected on one side to the additional overhead transmission line 4 and on the other side being joined together in common points 28, one of them being grounded, a three-phase set 25 of switching apparatuses with individually controlled phases, which connect the overhead transmission line 3 to the common busbar system 12 of the distribution substation 2, and a three-phase set 26 of switching apparatuses connecting the additional overhead transmission line 4 to the common busbar system 12. The receiving substation 5 is made similarly to that shown in FIG. 10.

Figure 16:
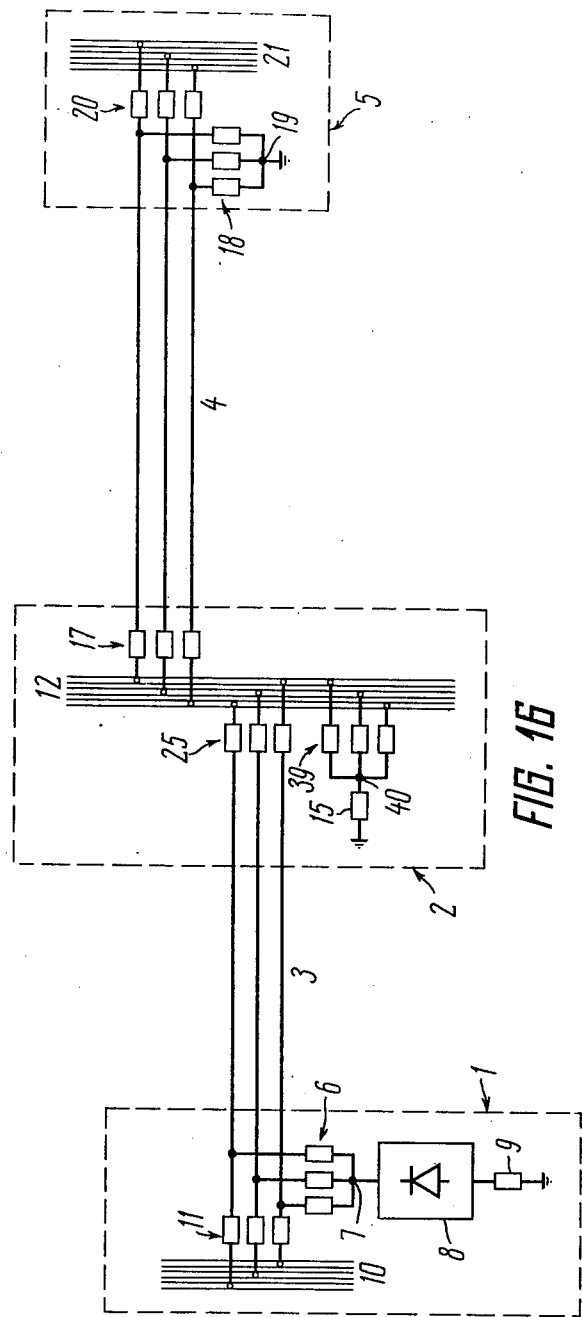
FIGS. 16 and 17 show embodiments of a high-voltage network for areas of increased intensity of icing, wherein the switching center, when the icing is melted, connects one of the conductors of the overhead transmission line to at least two conductors of the additional overhead transmission line, according to the invention.
Figure 19:
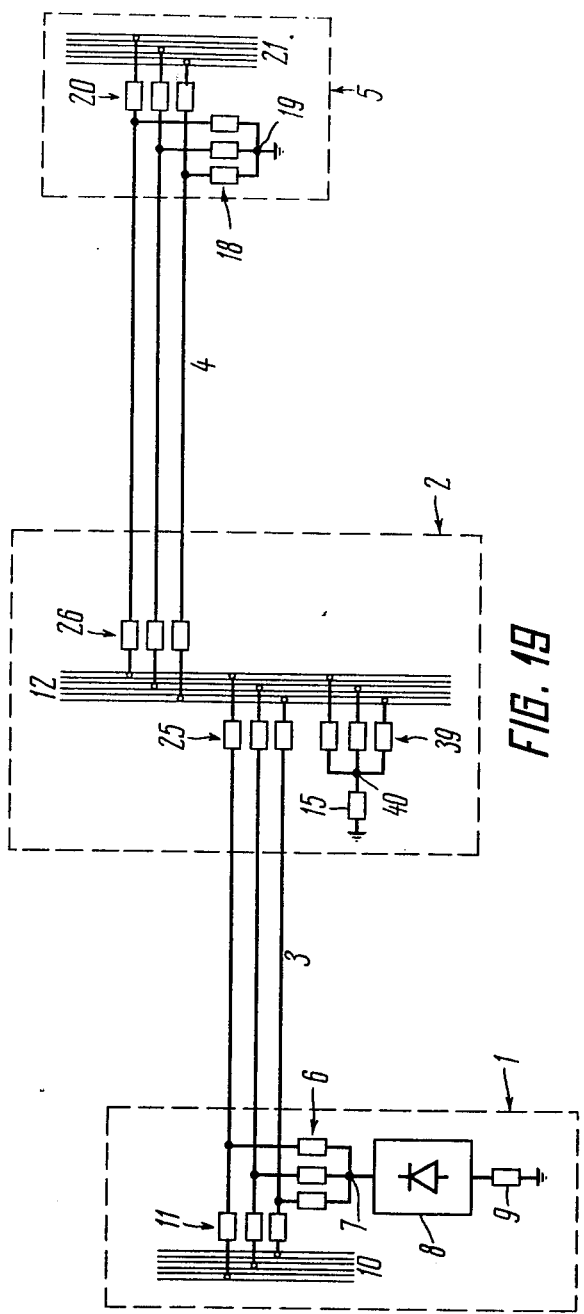

The high-voltage network for areas of increased intensity of icing embodied as in FIG. 19 as distinct from the high-voltage network for areas of increased intensity of icing as embodied in FIG. 16 features a three-phase set 26 (FIG. 19) of switching apparatuses instead of the three-phase set 17 (FIG. 16) of switching apparatuses with individually controlled phases.

Figure 20:
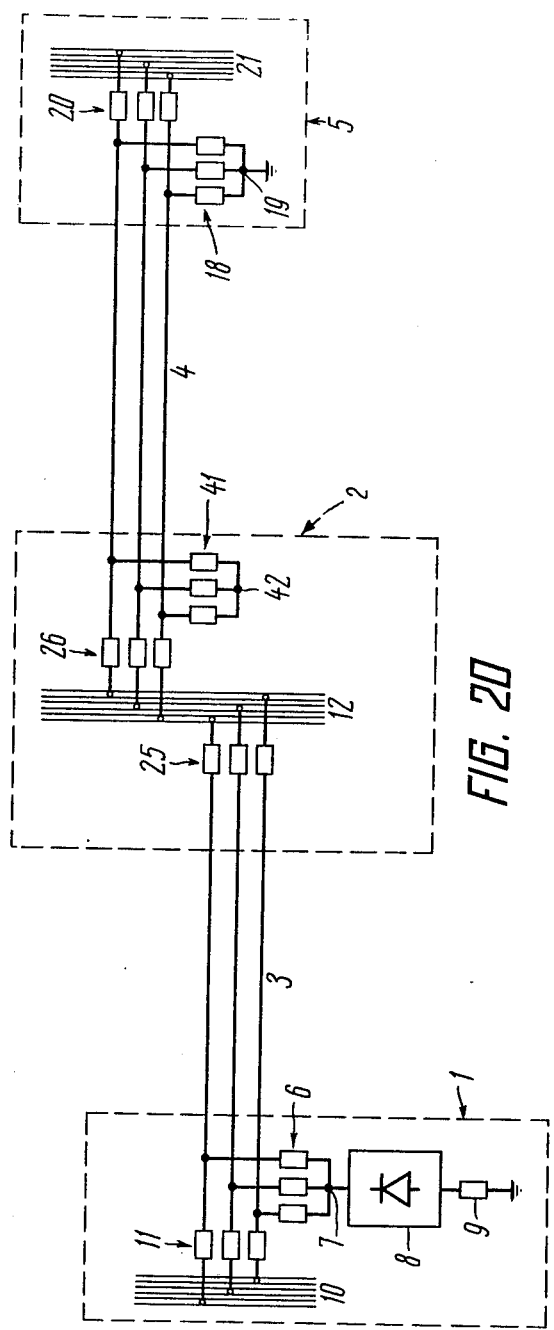

The high-voltage network for areas of increased intensity of icing embodied as in FIG. 20 as distinct from the high-voltage network for areas of increased instensity of icing as embodied in FIG. 17 employs a three-phase set 41 (FIG. 20) of switching apparatuses on one side connected to the additional overhead transmission line 4 and on the other side are joined in a common point 42, instead of the three-phase set 27 (FIG. 17) of switching apparatuses with individually controlled phases.

Figure 21:
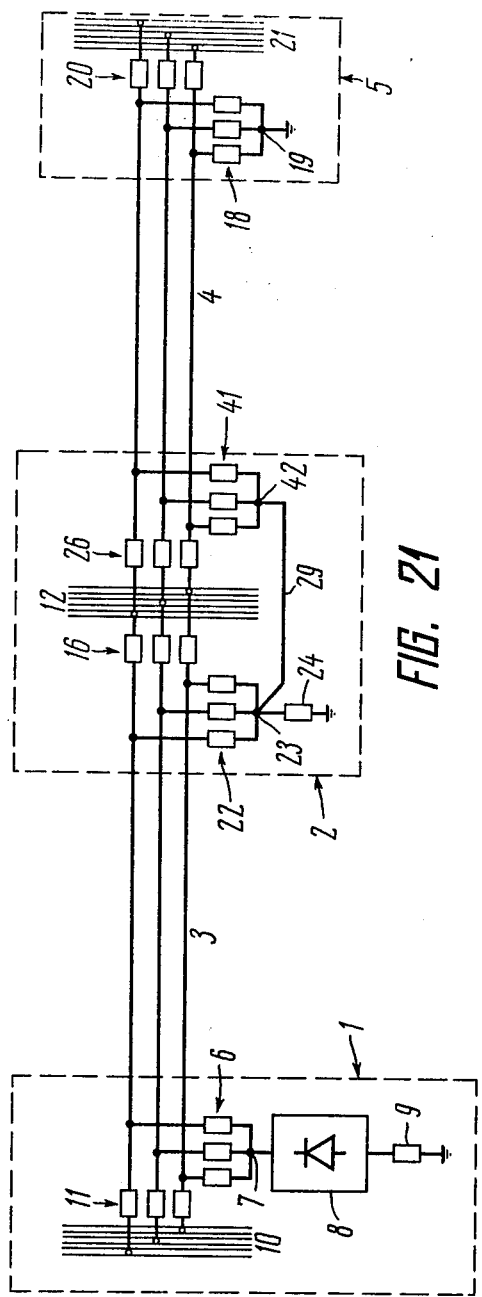

The high-voltage network for areas of increased intensity of icing embodied as in FIG. 21 as distinct from the high-voltage network for areas of increased intensity of icing as embodied in FIG. 3 is equipped with a three-phase set 41 (FIG. 21) of switching apparatuses connected on one side to the additional overhead transmission line 4 and joined together in a common point 42 on the other side, instead of the three-phase set 27 (FIG. 3) of switching apparatuses with individually controlled phases. A single-phase jumper 29 links the common points 23 and 42.

Figure 4:
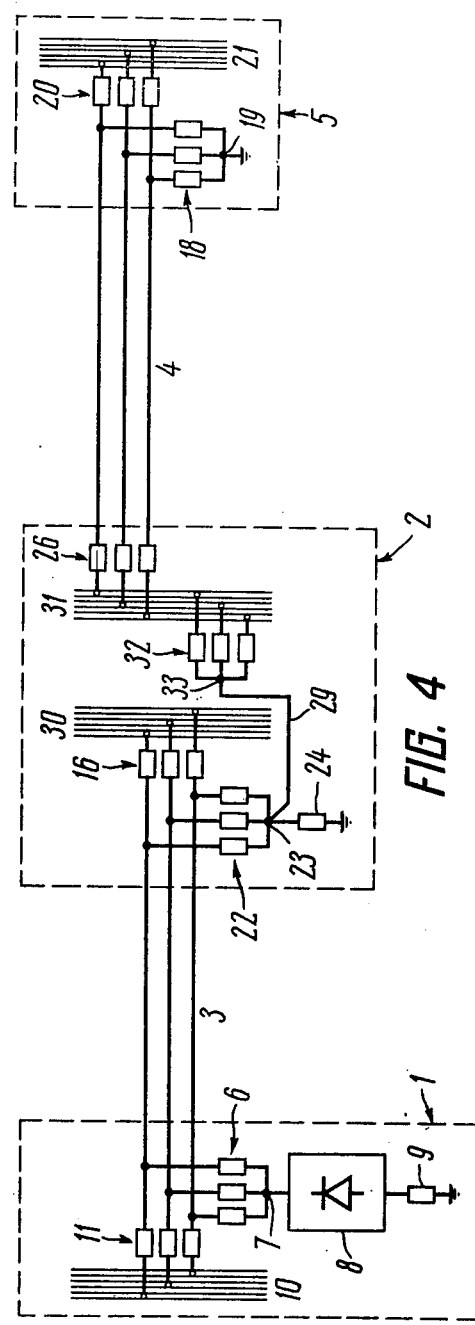

The high-voltage network for areas of increased intensity of icing embodied as in FIG. 22 as distinct from the high-voltage network for areas of increased intensity of icing as embodied in FIG. 4 is equipped with a three-phase set 43 of switching apparatuses connected on one side to the busbar system 31 and joined together on the other side in a common point 44 instead of the three-phase set 32 (FIG. 4) of switching apparatuses with individually controlled phases. A single-phase jumper 29 connects the common points 23 and 44.

Consider now the process of melting the icing in a high-voltage network for areas of increased intensity of icing.

Figure 1:
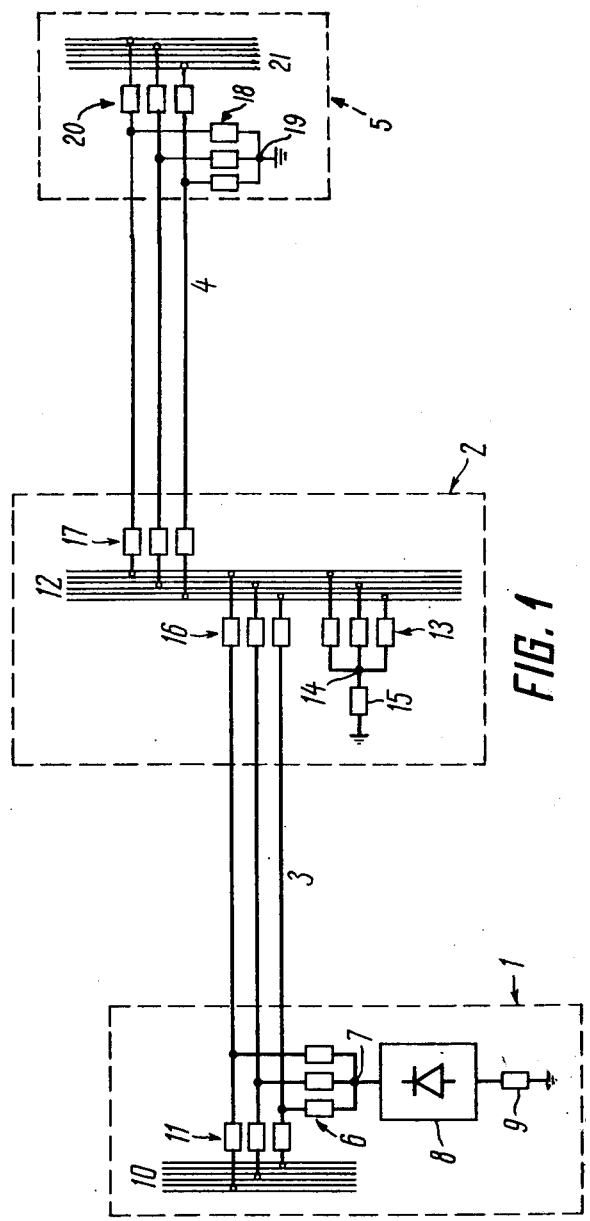

In the operational condition of the claimed high-voltage network of FIG. 1 the three-phase sets 11, 16, 20 of switching apparatuses and the three-phase set 17 of switching apparatuses with individually controlled phases are on. By the operational condition of the high-voltage network for areas of increased intensity of icing is meant transmission of electric energy by the overhead transmission line 3 and the additional overhead transmission line 4. The three-phase sets 6, 18 of switching apparatuses, the three-phase set 13 of switching apparatuses with individually controlled phases and the single-phase switching apparatuses 9, 15 are off.

To melt the icing on the conductors of the overhead transmission line 3 the three-phase set 11 of switching apparatuses and the three-phase set 17 of switching apparatuses with individually controlled phases are turned off. The three-phase set 6 of switching apparatuses and the single-phase switching apparatuses 9 and 15 are turned on. The icing on the conductors of the overhead transmission line 3 is melted by turning on successively the switching apparatuses of the three-phase set 13 of switching apparatuses with individually controlled phases.

The single-phase switching apparatus 15 and the three-phase set 20 of switching apparatuses are then turned off. The three-phase set 18 of switching apparatuses is on, as well as one of the switching apparatuses of the three-phase set 17 of switching apparatuses with individually controlled phases and two or three switching apparatuses of the three-phase set 13 of switching apparatuses with individually controlled phases depending on the parameters of the conductors of the overhead transmission line 3 and the additional overhead transmission line 4. The icing on all conductors of the additional overhead transmission line 4 is removed by turning on successively the switching apparatuses of the three-phase set 17 of switching apparatuses with individually controlled phases.

The icing can be melted simultaneously on two conductors of the additional overhead transmission line 4 of the above described high-voltage network by turning on the three-phase sets 6, 16 18 of switching apparatuses, the single-phase switching apparatus 9, and three switching apparatuses of the three-phase set 13 of switching apparatuses with individually controlled phases and by successively turning on two of the switching apparatuses of the three-phase set 17 of switching apparatuses with individually controlled phases.

Figure 2:
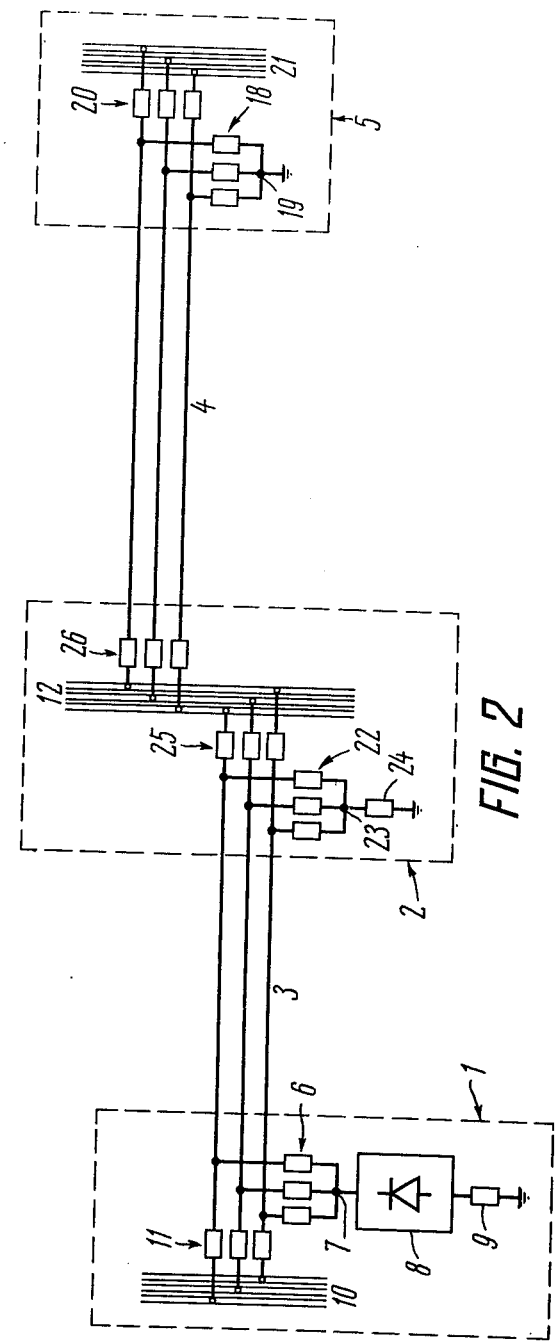

In the operational condition of the high-voltage network of FIG. 2 the three-phase sets 11, 26, 20 of switching apparatuses and the three-phase set 25 of switching apparatuses with individually controlled phases are on. The rest of the switching apparatuses are off.

To melt the icing on the conductors of the overhead transmission line 3 the three-phase set 11 of switching apparatuses and the three-phase set 25 of switching apparatuses with individually controlled phases are turned off. The three-phase set 6 of switching apparatuses and the single-phase switching apparatuses 9, 24 are turned on. Then the icing is melted on the conductors of the overhead transmission line by successively turning on the switching apparatuses of the three-phase set 22 of switching apparatuses with individually controlled phases.

The single-phase switching apparatus 24 and the three-phase set 20 of switching apparatuses are turned off. The three-phase set 18 of switching apparatuses is turned on, as well as one of the switching apparatuses of the three-phase set 25 of switching apparatuses with individually controlled phases and two or three switching apparatuses of the three-phase set 22 of switching apparatuses with individually controlled phases depending on the parameters of the conductors of the overhead transmission line 3 and the additional overhead transmission line 4. The icing on the conductors of the additional overhead transmission line 4 is melted by successively turning on the switching apparatuses of the three-phase set 25 of switching apparatuses with individually controlled phases.

In the operational condition of the high-voltage network of FIG. 3 the three-phase sets 11, 16, 26, 20 of switching apparatuses are turned on. The rest of the switching apparatuses are turned off.

To melt the icing on the condutors of the overhead transmission line 3 the three-phase sets 11, 16 of switching apparatuses are shut off. The three-phase set 6 of switching apparatuses and the single-phase switching apparatuses 9, 24 are turned on. The icing on the conductors of the overhead transmission line 3 is melted by successively turning on the switching apparatuses of the three-phase set 22 of switching apparatuses with individually controlled phases.

The single-phase switching apparatus 24 and the three-phase sets 26, 20 of switching apparatuses are then turned off. The three-phase set 18 of switching apparatuses is turned on, as well as two or three switching apparatuses of the three-phase set 22 of switching apparatuses with individually controlled phases depending on the parameters of the conductors of the overhead transmission line 3 and the additional overhead transmission line 4. By successively turning on the switching apparatuses of the three-phase set 27 of switching apparatuses with individually controlled phases the icing is melted on the conductors of the additional overhead transmission line 4.

The icing can be melted simultaneously on two conductors of the additional overhead transmission line 4 of the above described high-voltage network when the three-phase sets 6,18 of switching apparatuses are turned on together with the single-phase switching apparatus 9, three switching apparatuses of the three-phase set 22 of switching apparatuses with individually controlled phases and two of the switching apparatuses of the three-phase set 27 of switching apparatuses with individually controlled phases.

It is also possible to melt the icing on conductors of the above described high-voltage network, wherein in distinction to the forementioned arrangement one switching apparatus of the three-phase set 22 of switching apparatuses with individually controlled phases is turned on as well as two or three switching apparatuses of the three-phase set 27 of switching apparatuses with individually controlled phases depending on the parameters of the conductors of the overhead transmission line 3 and the additional overhead transmission line 4. In this condition the icing is melted either on the conductors of both transmission lines simultaneously or on the conductors of one of the lines depending on the ratio of the cross sections of the conductors of the overhead transmission line 3 and the additional overhead transmission line 4.

In the operational condition of the claimed high-voltage network of FIG. 4 the three-phase sets 11, 16, 26, 20 of switching apparatuses are on. The rest of the switching apparatuses are shut off.

The icing is melted on the conductors of the overhead transmission line 3 like in the previous case.

To melt the icing on the conductors of the additional overhead transmission line 4 the single-phase switching apparatus 24 and the three-phase sets 26, 20 of switching apparatuses are turned off. The three-phase set 18 of switching apparatuses is turned on together with two or three switching apparatuses of the three-phase set 22 of switching apparatuses with individually controlled phases depending on the parameters of the overhead transmission line 3 and the additional overhead transmission line 4. By successively turning on switching apparatuses of the three-phase set 32 of switching apparatuses with individually controlled phases the icing is melted on the conductors of the additional overhead transmission line 4.

The icing can be melted simultaneously on two conductors of the additional overhead transmission line 4 of the above described high-voltage network, wherein the three-phase sets 6, 18, 26 of switching apparatuses are turned on together with the single-phase switching apparatus 9, three switching apparatuses of the three-phase set 22 of switching apparatuses with individually controlled phases and two of the switching apparatuses of the three-phase set 32 of switching apparatuses with individually controlled phases.

It is also possible to melt the icing on conductors of the above described high-voltage network, wherein in distinction to the forementioned arrangement one switching apparatus of the three-phase set 22 of switching apparatuses with individually controlled phases is turned on as well as two or three switching apparatuses of the three-phase set 32 of switching apparatuses with individually controlled phases depending on the parameters of conductors of the overhead transmission line 3 and the additional overhead transmission line 4.

Figure 5:
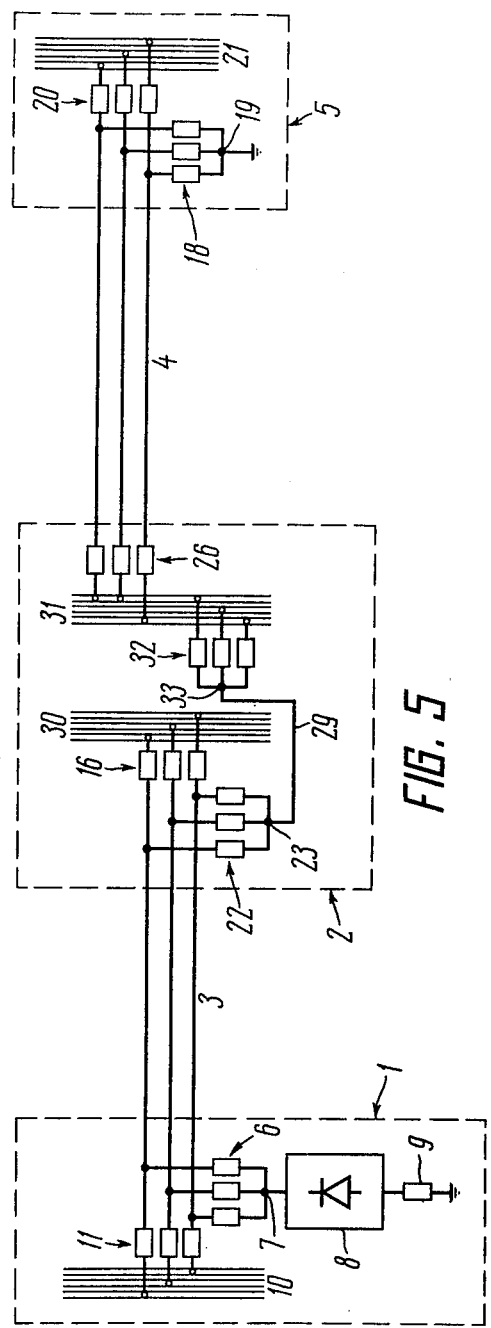

The operational condition of the high-voltage network of FIG. 5 is similar to the operational condition of the network of FIG. 4.

For simultaneous melting of icing on the conductors of the overhead transmission line 3 and the additional overhead transmission line 4, the three-phase sets 11, 16, 20 of switching apparatuses are turned off. The three-phase sets 6, 18 of switching apparatuses are turned on together with the single-phase switching apparatus 9 and two or three switching apparatuses of the three-phase set 22 of switching apparatuses with individually controlled phases depending on the parameters of the conductors of the overhead transmission line 3 and the additional overhead transmission line 4. By successively turning on switching apparatuses of the three-phase set 32 of switching apparatuses with individually controlled phases, the icing is melted simultaneously on two or three conductors of the overhead transmission line and on one of the conductors of the additional overhead transmission line 4.

The operational condition of the high-voltage network shown in FIG. 6 is similar to the operational condition of the network of FIG. 4.

The icing on the conductors of the overhead transmission line 3 is melted like in the network of FIG. 4.

The single-phase switching apparatus 24 and the three-phase set 20 of switching apparatuses are then turned off. The single-phase switching apparatuses 34, 35, 36, 37 are turned on together with two or three switching apparatuses of the three-phase set 22 of switching apparatuses with individually controlled phases depending on the parameters of the conductors of the overhead transmission line 3 and the additional overhead transmission line 4. In this way the icing is melted simultaneously on three series-connected conductors of the additional overhead transmission line 4.

The operational condition of the high-voltage network of FIG. 7 is similar to the operational condition of the network of FIG. 3.

The icing is melted on the conductors of the overhead transmission line 3 like in the case described in FIG. 3.

The single-phase switching apparatus 24 and the three-phase sets 20, 26 of switching apparatuses are then turned off. The single-phase switching apparatuses 35, 36, 37 are turned on together with two or three switching apparatuses of the three-phase set 22 of switching apparatuses with individually controlled phases depending on the parameters of the conductors of the overhead transmission line 3 and the additional overhead transmission line 4. In this way the icing is melted simultaneously on three series-connected conductors of the additional overhead transmission line 4.

The operational condition of the high-voltage network as shown in FIG. 8 and the melting of icing on conductors of the overhead transmission line 3 and the additional overhead transmission line 4 are effected similarly to the operational condition and melting of icing on conductors of the overhead transmission line 3 and the additional overhead transmission line 4 as shown in FIG. 7, but in melting the icing on the conductors of the additional overhead transmission line 4 the single-phase switching apparatus 38 is also turned on.

The operational condition of the high-voltage network of FIG. 9 and conditions of melting of icing on conductors of the overhead transmission line 3 and the additional overhead transmission line 4 are effected similarly to the operational condition and conditions of melting of icing on conductors of the overhead transmission line 3 and the additional overhead transmission line 4 of the network of FIG. 6.

In the operatioal condition of the high-voltage network of FIG. 10 the three-phase sets 11, 16, 20 of switching apparatuses are turned on as well as the three-phase set 17 of switching apparatuses with individually controlled phases. The rest of the switching apparatuses are shut off.

The icing is melted on conductors of the overhead transmission line 3 like in the case shown in FIG. 1.

The single-phase switching apparatus 15 and the three-phase set 20 of switching apparatuses are then turned off. The three-phase set 18 of switching apparatuses is turned on together with two or three switching apparatuses of the three-phase set 13 of switching apparatuses with individually controlled phases depending on the parameters of conductors of the overhead transmission line 3 and the additional overhead transmission line 4. The icing on the conductors of the additional overhead transmission line 4 is melted by successively turning on one of the switching apparatuses of the three-phase set 17 of switching apparatuses with individually controlled phases, which connect the conductors of the additional overhead transmission line 4 to the common busbar system 12, and two of the switching apparatuses of the three-phase set 27 of switching apparatuses with individually controlled phases connected to the two other conductors of the additional overhead transmission line 4.

The icing can also be melted on conductors of the forementioned high-voltage network, wherein in distinction to the above described arrangement three switching apparatuses of the three-phase set 13 of switching apparatuses with individually controlled phases are turned on together with two switching apparatuses of the three-phase set 17 of switching apparatuses with individually controlled phases, which connect the conductors of the additional overhead transmission line to the common busbar system 12, and one of the switching apparatuses of the three-phase set 27 of switching apparatuses with individually controlled phases, which is connected to the remaining conductor of the additional overhead transmission line 4.

In the operational condition of the claimed high-voltage network of FIG. 11 the three-phase sets 11, 26, 20 of switching apparatuses are turned on as well as the three-phase set 25 of switching apparatuses with individually controlled phases. The rest of the switching apparatuses are shut off.

The icing is melted on the conductors of the overhead transmission line 3 similarly to the manner described in the case of FIG. 2.

The single-phase switching apparatus 24 and the three-phase set 20 of switching apparatuses are then turned off. The three-phase set 18 of switching apparatuses is turned on along with two or three switching apparatuses of the three-phase set 22 of switching apparatuses with individually controlled phases depending on the parameters of the conductors of the overhead transmission line 3 and the additional overhead transmission line 4. The icing on the conductors of the additional overhead transmission line 4 is melted by successively turning on one of the switching apparatuses from the three-phase set 25 of switching apparatuses with individually controlled phases, each of them connecting a conductor of the overhead transmission line 3 to one of the busbars from the busbar system 12, and two of the switching apparatuses of the three-phase set 27 of switching apparatuses with individually controlled phases, which are connected to the conductors of the additional overhead transmission line 4 leading from the two remaining busbars of the busbar system 12.

The operational condition of the claimed high-voltage network of FIG. 12 and the condition of melting of icing on conductors of the overhead transmission line 3 are effected similarly to the operational condition and the condition of melting of icing on conductors of the overhead transmission line 3 of the network of FIG. 3.

The single-phase switching apparatus 24 and the three-phase sets 20, 26 of switching apparatuses are then turned off. The three-phase set 18 of switching apparatuses is turned on along with two or three switching apparatuses of the three-phase set 22 of switching apparatuses with individually controlled phases depending on the parameters of conductors of the overhead transmission line 3 and the additional overhead transmission line 4. The icing on the conductors of the additional overhead transmission line 4 is melted by successively turning on one of the switching apparatuses of the three-phase set 27 of switching apparatuses with individually controlled phases, their common point 28 being connected to the common point 23, said apparatus being coupled to one of the conductors of the additional overhead transmission line 4, and two of the switching apparatuses of the three-phase set 27 of switching apparatuses with individually controlled phases, their common point 28 being grounded and said apparatuses being coupled to the two remaining conductors of the additional overhead transmission line 4.

The icing can be also melted on conductors of the foremention high-voltage network, wherein three switching apparatuses of the three-phase set 22 of switching apparatuses with individually controlled phases are turned on along with the switching apparatuses of the three-phase set 27 of switching apparatuses with individually controlled phases, their common point 28 being linked with the common point 23, and one switching apparatus of the three-phase set 27 of switching apparatuses with individually controlled phases, their common point 28 being grounded. In this arrangement the icing is melted on two conductors of the additional overhead transmission line 4.

If one of the switching apparatuses of the three-phase set 22 of switching apparatuses with individually controlled phases is turned on, the three-phase sets 27 of switching apparatuses with individually controlled phases being connected as mentioned above, the icing can be melted on two conductors of the additional overhead transmission line 4.

The operational condition of the high-voltage network of FIG. 13 and melting of icing on the conductors of the overhead transmission line 3 are effected similarly to the operational condition and melting of icing on the conductors of the overhead transmission line 3 of the network of FIG. 12.

The single-phase switching apparatus 24 and the three-phase set 20 of switching apparatuses are then turned off. The three-phase set 18 of switching apparatuses is turned on along with two or three switching apparatuses of the three-phase set 22 of switching apparatuses with individually controlled phases depending on the parameters of the conductors of the overhead transmission line 3 and the additional overhead transmission line 4. The icing on the conductors of the additional overhead transmission line 4 is melted by successively turning on one of the switching apparatuses of the three-phase set 32 of switching apparatuses with individually controlled phases, each of them being connected to one of the busbars of the busbar system 31, and two of the switching apparatuses of the three-phase set 27 of switching apparatuses with individually controlled phases, which are connected to the conductors of the additional overhead transmission line 4 leading from the two remaining busbars of the busbar system 31.

It is also possible to melt the icing on conductors of the above described high-voltage network, wherein three switching apparatuses of the three-phase set 22 of switching apparatuses with individually controlled phases are turned on along with two switching apparatuses of the three-phase set 32 of switching apparatuses with individually controlled phases and one switching apparatus of the three-phase set 27 of switching apparatuses with individually controlled phase. In this case the icing is melted on two conductors of the additional overhead transmission line 4.

If one of the switching apparatuses of the three-phase set 22 of switching apparatuses with individually controlled phases is turned on, and the three-phase sets 27 and 32 of switching apparatuses are turned on as described above, the icing can be melted on two conductors of the additional overhead transmission line 4.

Figure 14:
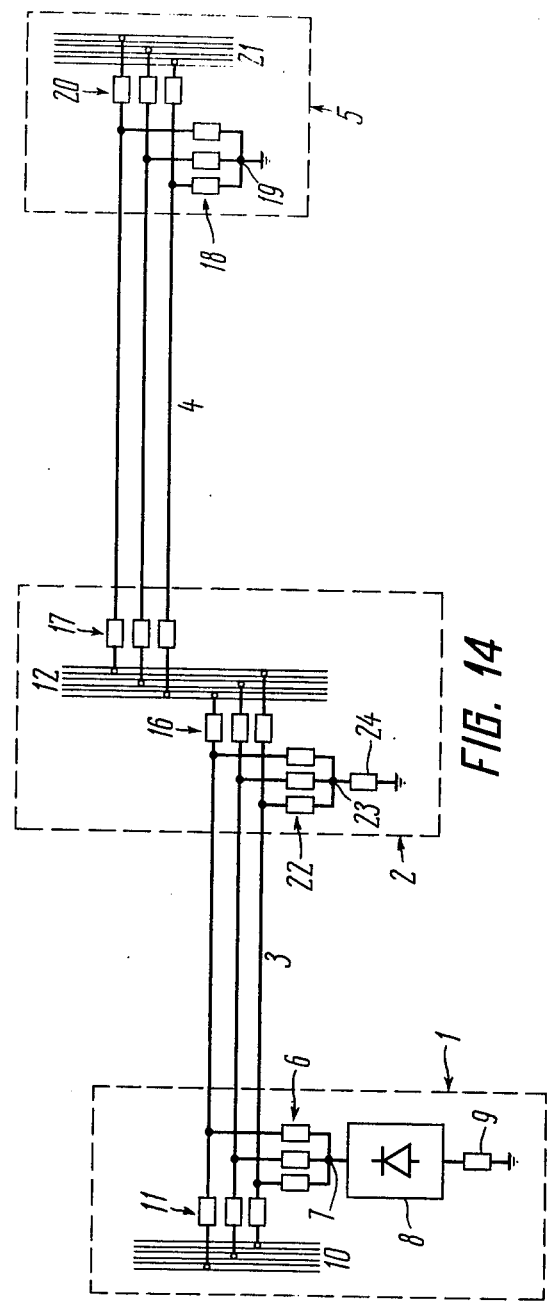
FIGS. 14 and 15 show embodiments of a high-voltage network for areas of increased intensity of icing, wherein the switching center, when the icing is melted, connects three conductors of the overhead transmission line to two of the conductors of the additional overhead transmission line, according to the invention.

In the operational condition of the high-voltage network illustrated in FIG. 14 the three-phase sets 11, 16, 20 of switching apparatuses and the three-phase set 17 of switching apparatuses with individually controlled phases are turned on. The rest of the switching apparatuses are turned off.

To melt the icing on the conductors of the overhead transmission line 3 the three-phase sets 11 and 16 of switching apparatuses are turned off. The three-phase set 6 of switching apparatuses and the single-phase switching apparatuses 9 and 24 are turned on. By turning on successively the switching apparatuses of the three-phase set 22 of switching apparatuses with individually controlled phases the icing is melted on the conductors of the overhead transmission line 3.

The single-phase switching apparatus 24 and the three-phase set 20 of switching apparatuses are then turned off. The three-phase set 18 of switching apparatuses and three switching apparatuses of the three-phase set 22 of switching apparatuses with individually controlled phases are turned on. By turning on successively two switching apparatuses of the three-phase set 17 of switching apparatuses with individually controlled phases the icing is melted on the conductors of the additional overhead transmission line 4.

In the operational condition of the high-voltage network of FIG. 15 the three-phase sets 11, 16 and 20 of switching apparatuses and the three-phase set 17 of switching apparatuses with individually controlled phases are turned on. The remaining switching apparatuses are turned off.

To melt the icing on the conductors of the overhead transmission line 3 the three-phase sets 11 and 16 of switching apparatuses are shut off. The three-phase set 6 of switching apparatuses and the single-phase switching apparatuses 9 and 24 are turned on. By successively switching apparatuses of the three-phase set 22 of switching apparatuses with individually controlled phases the icing is melted on the conductors of the overhead transmission line 3.

The single-phase switching apparatus 24 and the three-phase set 20 of switching apparatuses are then shut off. The three-phase set 18 of switching apparatuses and three switching apparatuses of the three-phase set 22 of switching apparatuses with individually controlled phases are turned on. The icing is melted on the conductors overhead transmission line 4 by successively switching two of the switching apparatuses of the three-phase set 17 of switching apparatuses with individually controlled phases, which connect the conductors of the additional overhead transmission line 4 to the common busbar system 12, and one switching apparatus of the three-phase set 27 of switching apparatuses with individually controlled phases, connected to the remaining conductor of the additional overhead transmission line 4.

In the operational condition of the proposed high-voltage network of FIG. 16 the three-phase sets 11 and 20 of switching apparatuses and three-phase sets 17 and 25 of switching apparatuses with individually controlled phases are turned on. The remaining switching apparatuses are turned off.

To melt the icing on the conductors of the overhead transmission line 3 the three-phase set 11 of switching apparatuses and the three-phase set 17 of switching apparatuses with individually controlled phases are shut off. The three-phase sets 6 and 39 of switching apparatuses and the single-phase switching apparatuses 9 and 15 are turned on.

By switching successively switching apparatuses of the three-phase set 25 of switching apparatuses with individually controlled phases the icing is melted on the conductors of the overhead transmission line 3.

The single-phase switching apparatus 15 and the three-phase set 20 of switching apparatuses are then shut off. The three-phase set 18 of switching apparatuses is turned on along with two or three switching apparatuses of the three-phase set 17 of switching apparatuses with individually controlled phases depending on the parameters of the conductors of the overhead transmission line 3 and the additional overhead transmission line 4. In this way the icing is melted simultaneously on two or three conductors of the additional overhead transmission line 4, which are connected to one conductor of the overhead transmission line 3.

In the operational condition of the high-voltage network of FIG. 17 the three-phase sets 11, 26 and 20 of switching apparatuses and the three phase set 25 of switching apparatuses with individually controlled phases are turned on. The rest of the switching apparatuses are turned off.

To melt the icing simultaneously on the conductors of the overhead transmission line 3 and the additional overhead transmission line 4 the three-phase sets 11 and 20 of switching apparatuses are turned off. The three-phase sets 6 and 18 of switching apparatuses and the single-phase switching apparatus 9 are turned on. Then one switching apparatus of the three-phase set 25 of switching apparatuses with individually controlled phases and two or three switching apparatuses of the three-phase set 27 of switching apparatuses with individually controlled phases, depending on the parameters of the overhead transmission line 3 and the additional overhead transmission line 4, are successively turned on. In this way the icing is melted simultaneously on one conductor of the overhead transmission line 3 and two or three conductors of the additonal overhead transmission line 4.

In the operational condition of the claimed high-voltage network of FIG. 18 the three-phase sets 11, 20 and 26 of switching apparatuses and the three-phase set 25 of switching apparatuses with individually controlled phases are turned on. The remaining switching apparatuses are shut off.

For simultaneous melting of the icing on the conductors of the overhead transmission line 3 and the additional overhead transmission line 4 the three-phase sets 11 and 20 of switching apparatuses are shut off. The three-phase sets 6 and 18 of switching apparatuses and the single-phase switching apparatus 9 are turned on. Then one switching apparatus of the three-phase set 25 of switching apparatuses with individually controlled phases, each of them connecting one of the conductors of the overhead transmission line 3 to one of the busbars of the common busbar system 12, two switching apparatuses of the three-phase set 27 of switching apparatuses with individually controlled phases, which are connected to the conductors of the additional overhead transmission line 4 and one of them leading from the same busbar of the common busbar system 12, and one of the switching apparatuses of the three-phase set 27 of switching apparatuses with individually controlled phases, their common point 28 being grounded, said apparatus being connected to the remaining conductor of the additional overhead transmission line 4, are turned on in succession. In this case one conductor of the overhead transmission line 3 is connected to two conductors of the additional overhead transmission line 4.

In the operational condition of the high-voltage network of FIG. 19 the three-phase sets 11, 26 and 20 of switching apparatuses and the three-phase set 25 of switching apparatuses with individually controlled phases are turned on. The remaining switching apparatuses are turned off.

To melt the icing on the conductors of the overhead transmission line 3 the three-phase sets 11 and 26 of switching apparatuses are turned off and the three-phase sets 6 and 39 of switching apparatuses and the single-phase switching apparatuses 9 and 15 are turned on. By successively turning on switching apparatuses of the three-phase set 25 of switching apparatuses with individually controlled phases the icing is melted on the conductors of the overhead transmission line 3.

The three-phase set 20 of switching apparatuses and the single-phase switching apparatus 15 are shut off. The three-phase sets 18 and 26 of switching apparatuses and two switching apparatuses of the three-phase set 25 of switching apparatuses with individually controlled phases are turned on. In this case the icing is melted on three conductors of the additional overhead transmission line 4, which are connected to two conductors of the overhead transmission line 3.

The operational condition of the high-voltage network of FIG. 20 is similar to the operational condition of the network of FIG. 19.

For simultaneous melting of the icing on two conductors of the overhead transmission line 3 and three conductors of the additional overhead transmission line 4 the three-phase sets 11 and 20 of switching apparatuses and one switching apparatus of the three-phase set 25 of switching apparatuses with individually controlled phases are turned off. The three-phase sets 6, 18 and 41 of switching apparatuses and the single-phase switching apparatus 9 are turned on.

The operational condition of the high-voltage network of FIG. 21 and melting of icing on the conductors of the overhead transmission line 3 are effected similarly to the operational condition and melting of icing on the conductors of the overhead transmission line 3 of the network of FIG. 3.

To melt the icing on three conductors of the additional overhead transmission line 4 the three-phase sets 20 and 26 and the single-phase switching apparatus 24 are turned off. The three-phase sets 18 and 41 of switching apparatuses and two switching apparatuses of the three-phase set 22 of switching apparatuses with individually controlled phases are turned on.

The operational condition of the high-voltage network of FIG. 22 and melting of the icing on the conductors of the overhead transmission line 3 are effected similarly to the operational condition and melting of the icing on the conductors of the overhead transmission line 3 of the network of FIG. 4.

Then to melt the icing on three conductors of the additional overhead transmission line 4 the three-phase set 20 and the single-phase apparatus 24 are turned off. The three-phase set 43 of switching apparatuses and two switching apparatuses of the three-phase set 22 of switching apparatuses with individually controlled phases are turned on.

The high-voltage network for areas of increased intensity of icing featuring various embodiments of a switching center permits melting of icing on conductors of additional overhead transmission lines through the use of a rectifier installed at the supply substation.

What is claimed is:

1. A high-voltage network for areas of increased intensity of icing comprising a supply substation; a distribution substation equipped with a common busbar system; a first overhead transmission line connecting said supply substation and said distribution substation; a second overhead transmission line leading from said distribution substation; a rectifier for melting the icing on the conductors of said overhead transmission lines with direct current by using a ground as a return conductor, said rectifier being installed at said supply substation; a switching center installed at said distribution substation which, during the operational condition of the high-voltage network, connects said first overhead transmission line and said second overhead transmission line to said common busbar system of said distribution substation and, during deicing of the conductors of said second overhead transmission line, connects at least two conductors of said first overhead transmission line to one of the conductors of said second overhead transmission line.

2. A high-voltage network as claimed in claim 1, wherein said switching center comprises a three-phase set of switching apparatuses with individually controlled phases, which are on one side connected to said first overhead transmission line and on the other side are joined together in a common point; a single-phase switching apparatus connecting said common point to the ground; a three-phase set of switching apparatuses which connect said first overhead transmission line to said common busbar system; and a three-phase set of switching apparatuses connecting said second overhead transmission line to said common busbar system.

3. A high-voltage network as claimed in claim 1, wherein said switching center comprises a three-phase set of switching apparatuses with individually controlled phases, which are connected on one side to the conductors of said first overhead transmission line and on the other side are joined together in a common point; a single-phase switching apparatus connecting said common point to the ground; a three-phase set of switching apparatuses with individually controlled phases, which connect said first overhead transmission line to said common busbar system; a three-phase set of switching apparatuses connecting said second overhead transmission line to said common busbar system; and a three-phase set of switching apparatuses with individually controlled phases, which are on one side connected to the conductors of said second overhead transmission line and on the other side are joined together in a common point which is grounded.

4. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using a ground as a return conductor, said rectifier being installed at said supply substation; a switching center installed at said distribution substation and comprising:
- a three-phase set of switching apparatuses with individually controlled phases, which are on one side connected to said common busbar system and on the other side joined together in a common point;
- a single-phase switching apparatus connecting said common point to the ground;
- a three-phase set of switching apparatuses connecting said first overhead transmission line to said common busbar system;
- a three-phase set of switching apparatuses with individually controlled phases, which connect said second overhead transmission line to said common busbar system.

5. A high-voltage network for areas of increased intensity of icing comprising a supply substation; a distribution substation equipped with a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation and comprising;
- first and second three-phase sets of switching apparatuses with individually controlled phases;
- said switching apparatuses of each of said three-phase sets of switching apparatuses are on one side joined together in a common point and on the other side said switching apparatuses of the first three-phase set of switching apparatuses are connected to said first overhead transmission line and said switching apparatuses of the second three-phase set of switching apparatuses are connected to said second overhead transmission line;
- a single-phase jumper connecting said common points;
- a single-phase switching apparatus connecting said single-phase jumper to the ground;
- a three-phase set of switching apparatuses connecting said first overhead transmission line to said common busbar system;
- a three-phase set of switching apparatuses connecting said second overhead transmission line to said common busbar system.

6. A high-voltage network for areas of increased intensity of icing comprising a supply substation; a distribution substation having a first busbar system and a second busbar system; a first overhead transmission line linking said supply substation and said distribution substation; a second overhead transmission line leading from said distribution substation; a rectifier for melting the icing on the conductors of said overhead transmission lines with direct current by using the ground as a return conductor, said rectifier being set up at said supply substation; a switching center installed at said distribution substation and comprising:
- a three-phase set of switching apparatuses connecting said second overhead transmission line to said first busbar system;
- first and second three-phase sets of switching apparatuses with individually controlled phases,
- said switching apparatuses of each of said three-phase sets of switching apparatuses are on one side joined together in a common point and on the other side said switching apparatuses of said first three-phase set of switching apparatuses are connected to said first overhead transmission line and the switching apparatuses of said second three-phase set of switching apparatuses are connected to said first busbar system;
- a single-phase jumper connecting said common points;
- a single-phase switching apparatus connecting said single-phase jumper to the ground;
- a three-phase set of switching apparatuses connecting said first overhead transmission line to said second busbar system.

7. A high-voltage network for areas of increased intensity of icing comprising a supply substation; a distribution substation having a first busbar system and a second busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which, during the operational condition of the high-voltage network, connects said first overhead transmission line and said second overhead transmission line to said second and said first busbar system and, during simultaneous deicing of the conductors of said second overhead transmission line and of the conductors of said first overhead transmission line, connects at least two conductors of said first overhead transmission line to one of the conductors of said second overhead transmission line, said switching center comprises:
- a three-phase set of switching apparatuses connecting said second overhead transmission line to said first busbar system;
- first and second three-phase sets of switching apparatuses with individually controlled phases,
- said switching apparatuses of each of said sets of switching apparatuses are joined on one side to a common point and on the other side the switching apparatuses of the first three-phase sets of switching apparatuses are connected to said first overhead transmission line and the switching apparatuses of the second three-phase sets of switching apparatuses are connected to said first busbar system;
- a single-phase jumper connecting said common points;
- a three-phase set of switching apparatuses connecting said first overhead transmission line to said second busbar system.

8. A high-voltage network for areas of increased intensity of icing comprising a supply substation; a distribution substation having a first busbar system and a second busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which connects, during the operational condition of the high-voltage network, said first overhead transmission line and said second overhead transmission line to said second and said first busbar systems and, during the deicing of the conductors of said second overhead transmission line, connects at least two conductors of said first overhead transmission line to three conductors of said second overhead transmission line, said switching center comprises:
  a three-phase set of switching apparatuses connecting said second overhead transmission line to said first busbar system;
  a three-phase set of switching apparatuses with individually controlled phases, which are on one side connected to said first overhead transmission line and on the other side are joined together in a common point;
  a single-phase switching apparatus connecting said common point to the ground;
  a single-phase switching apparatus connected on one side to one of the phases of said first busbar system;
  a single-phase jumper connecting the other side of said single-phase switching apparatus to said common point;
  a single-phase switching apparatus connecting the two other phases of said first busbar system;
  a three-phase set of switching apparatuses connecting said first overhead transmission line to said second busbar system.

9. A high-voltage network for areas of increased intensity of icing comprising a supply substation; a distribution substation having a first busbar system and a second busbar system; a first overhead transmission line connecting said supply substation and distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which connects, during the operational condition of the high-voltage network, the first overhead transmission line and the second overhead transmission line to said second busbar system and said first busbar system and, during deicing of the conductors of said second overhead transmission line, connects at least two conductors of said first overhead transmission line to three conductors of said second overhead transmission line, said switching center comprising:
  a three-phase set of switching apparatuses connecting said second overhead transmission line to said first busbar system;
  a three-phase set of switching apparatuses with individually controlled phases, which are on one side connected to said first overhead transmission line and on the other side are joined together in a common point;
  a single-phase jumper connecting said common point to one of the phases of said first busbar system;
  a single-phase switching apparatus connecting said common point to the ground;
  a single-phase switching apparatus connecting the two remaining phases of said first busbar system;
  a three-phase set of switching apparatuses connecting said first overhead transmission line to said second busbar system.

10. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation and comprising:
  a three-phase set of switching apparatuses with individually controlled phases, which are on one side connected to said common busbar system and on the other side are joined together in a common point;
  a single-phase switching apparatus connecting said common point to the ground;
  a three-phase set of switching apparatuses connecting said first overhead transmission line to said common busbar system;
  a three-phase set of switching apparatuses with individually controlled phases, which connect said second overhead transmission line to said common busbar system;
  a three-phase set of switching apparatuses with individually controlled phases, which are on one side connected to the conductors of said second overhead transmission line and on the other side are joined together in a common point which is grounded.

11. A high-voltage network for areas of increased intensity of icing comprising a supply substation; a distribution substation having a common busbar system; a first overhead transmission line connecting said supply substation and distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation and comprising:
  first and second three phase sets of switching apparatuses with individually controlled phases,
  said switching apparatuses of each of said sets of switching apparatuses are on one side joined together in a common point and on the other side said switching apparatuses of the first three-phase sets of switching apparatuses are connected to said first overhead transmission line and said switching apparatuses of the second three-phase sets of switching apparatuses are connected to said second overhead transmission line;
  a single-phase jumper connecting said common points;

a single-phase switching apparatus connecting said single-phase jumper to the ground;

a three-phase set of switching apparatuses with individually controlled phases, which are on one side connected to said second overhead transmission line and on the other side are joined in a common point which is grounded;

a three-phase set of switching apparatuses connecting said first overhead transmission line to said common busbar system;

a three-phase set of switching apparatuses connecting said second overhead transmission line to said common busbar system.

12. A high-voltage network for areas of increased intensity of icing comprising a supply substation; a distribution substation having a first busbar system and a second busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation and comprising:

a three-phase set of switching apparatuses connecting said second overhead transmission line to said first busbar system;

first and second three-phase sets of switching apparatuses with individually controlled phases, said switching apparatuses of each of said sets of switching apparatuses are on one side joined together in a common point and on the other side said switching apparatuses of the first three-phase sets of switching apparatuses are connected to said first overhead transmission line and said switching apparatuses of the second three-phase sets of switching apparatuses are connected to said first busbar system;

a single-phase jumper connecting said common points;

a single-phase switching apparatus connecting said single-phase jumper to the ground;

a three-phase set of switching apparatuses with individually controlled phases, which are on one side connected to said second overhead transmission line and on the other side are joined together in a common point which is grounded;

a three-phase set of switching apparatuses connecting said first overhead transmission line to said second busbar system.

13. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which, during the operational condition of the high-voltage network for areas of increased intensity of icing, connects said first overhead transmission line and said second overhead transmission line to said common busbar system of said distribution substation and, during deicing of the conductors of said second overhead transmission line, connects three conductors of said first overhead transmission line to two conductors of said second overhead transmission line, said switching center comprising:

a three-phase set of switching apparatuses with individually controlled phases, which are on one side connected to said first overhead transmission line and on the other side are joined together in a common point;

a single-phase switching apparatus connecting said common point to the ground;

a three-phase set of switching apparatuses connecting said first overhead transmission line to said common busbar system;

a three-phase set of switching apparatuses with individually controlled phases, which connect said second overhead transmission line to said common busbar system.

14. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which, during the operational condition of said high-voltage network, connects said first overhead transmission line and said second overhead transmission line to said common busbar system and, during deicing of the conductors of said second overhead transmission line, connects three conductors of said first overhead transmission line to two of the conductors of said second overhead transmission line, said switching center comprising:

a three-phase set of switching apparatuses with individually controlled phases, which are connected on one side to said first overhead transmission line and on the other side are joined together in a common point;

a single-phase switching apparatus connecting said common point to the ground;

a three-phase set of switching apparatuses connecting said first overhead transmission line to said common busbar system;

a three-phase set of switching apparatuses with individually controlled phases, which connect said second overhead transmission line to said common busbar system;

a three-phase set of switching apparatuses with individually controlled phases, which are on one side connected to conductors of said second overhead transmission line and on the other side are joined together in a common point which is grounded.

15. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines wth direct current by using the ground as a return conductor, said rectifier being installed at said supply substation; a switching center installed at said distribution substation, which, during the operational condition of the high-voltage network, connects said first overhead transmission line and said second overhead transmission line to said common busbar system of said distribution substation and, during simultaneous deicing of the conductors of said second overhead transmission line and of the conductors of said first overhead transmission line, connects one of the conductors of said first overhead transmission line to at least two conductors of said second overhead transmission line, said switching center comprising:
- a three-phase set of switching apparatuses connected on one side to said common busbar system and on the other side joined together in a common point;
- a single-phase switching apparatus connecting the common point to the ground;
- a three-phase set of switching apparatuses with individually controlled phases, which connect said first overhead transmission line to said common busbar system;
- a three-phase set of switching apparatuses with individually controlled phases, which connect said second overhead transmission line to said common busbar system.

16. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which, during the operational condition of the high-voltage network, connects said first overhead transmission line to said common busbar system of said distribution substation and, during simultaneous deicing of the conductors of said second overhead transmission line and of the conductors of said first overhead transmission line, connects one of the conductors of said first overhead transmission line to at least two conductors of said second overhead transmission line, said switching center comprising:
- a three-phase set of switching apparatuses with individually controlled phases, which on one side are connected to said second overhead transmission line and on the other side are joined together in a common point;
- a three-phase set of switching apparatuses with individually controlled phases, which connect said first overhead transmission line to said common busbar system;
- a three-phase set of switching apparatuses connecting said second overhead transmisson line to said common busbar system.

17. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which, during the operational condition of the high-voltage network, connects said first overhead transmission line and said second overhead transmission line to said common busbar system of said distribution substation and, during deicing of the conductors of said second overhead transmission line and of the conductors of said first overhead transmission line, connects one of the conductors of said first overhead transmission line to two of the conductors of said second overhead transmission line, said switching center comprising:
- first and second three-phase sets of switching apparatuses with individually controlled phases,
- said switching apparatuses of each of said sets of switching apparatuses are on one side connected to said second overhead transmission line and from the other side are joined together in a common point,
- said common point of one of said sets of switching apparatuses is grounded;
- a three-phase set of switching apparatuses with individually controlled phases, which connect said first overhead transmission line to said common busbar system;
- a three-phase set of switching apparatuses connecting said second overhead transmission line to said common busbar system.

18. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation; which, during the operational condition of the high-voltage network, connects said first overhead transmission line and said second overhead transmission line to said common busbar system of said distribution substation and, during deicing of the conductors of said second overhead transmission line, connects two conductors of said first overhead transmission line to three conductors of said first overhead transmission line to three conductors of said second overhead transmission line, said switching center comprising:
- a three-phase set of switching apparatuses connected on one side to said common busbar system and on the other side joined together in a common point;
- a single-phase switching apparatus connecting said common point to the ground;
- a three-phase set of switching apparatuses with individually controlled phases, which connect said first overhead transmission line to said common busbar system;
- a three-phase set of switching apparatuses connecting said second overhead transmission line to said common busbar system.

19. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which, during the operational condition of the high-voltage network, connects said first overhead transmission line and said second overhead transmission line to said common busbar system of said distribution substation and, during deicing of the conductors of said second overhead transmission line and of the conductors of said first overhead transmission line, connects two conductors of said first overhead transmission line to three conductors of said second overhead transmission, said switching center comprising:
- a three-phase set of switching apparatuses connected on one side to said second overhead transmission line and on the other side joined together in a common point;
- a three-phase set of switching apparatuses with individually controlled phases, which connect said first overhead trsnsmission line to said common busbar system;
- a three-phase set of switching apparatuses connecting said second overhead transmission line to said common busbar system.

20. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which, during the operational condition of the high-voltage network connects said first overhead transmission line and said second overhead transmission line to said common busbar system of said distribution substation and, during deicing of the conductors of said second overhead transmission line, connects two conductors of said first overhead transmission line to three conductors of said second overhead transmission line, said switching center comprising:
- a three-phase set of switching apparatuses with individually controlled phases, which are on one side connected to said first overhead transmission line and on the other side are joined together in a common point;
- a three-phase set of switching apparatuses connected on one side to said second overhead transmission line and on the other side joined together in a common point;
- a single-phase jumper joining said common points;
- a single-phase switching apparatus connecting said single-phase jumper to the ground;
- a three-phase set of switching apparatuses connecting said first overhead transmission line to said common busbar system;
- a three-phase set of switching apparatuses connecting said second overhead transmission line to said common busbar system.

21. A high-voltage network for areas of increased intensity of icing comprising a supply substation, a distribution substation having a first busbar system and a second busbar system; a first overhead transmission line connecting said supply substation and said distribution substation; a second overhead transmission line leading from said distribution substation; a rectifier for melting the icing on the conductors of said overhead transmission lines with direct current by using the ground as a return current, said rectifier being installed at said supply substation; a switching center installed at said distribution substation, which, during the operational condition of the high-voltage network, connects said first overhead transmission line and said second overhead transmission line to said second busbar system and said first busbar system and, during deicing of the conductors of the second overhead transmission line, connects two of the conductors of said first overhead transmission line to three conductors of said second overhead transmission line, said switching center comprising:
- a three-phase set of switching apparatuses connecting said second overhead transmission line to said first busbar system;
- a three-phase set of switching apparatuses connected on one side to said first busbar system and on the other side joined together in a common point;
- a three-phase set of switching apparatuses with individually controlled phases, which are on one side connected to said first overhead transmission line and on the other side are joined together in a common point;
- a single-phase jumper connecting said common points;
- a single-phase switching apparatus connecting sad single-phase jumper to the ground;
- a three-phase set of switching apparatuses connecting said first overhead transmission line to said second busbar system.

22. A high-voltage network for areas of increased intensity of icing comprising a supply substation; a distribution substation having a common busbar system; a first overhead transmission line connecting said supply substation and said distribution substation; a second overhead transmission line leading from said distribution substation; a rectifier for melting the icing on the conductors of said overhead transmission lines with direct current by using the ground as a return conductor, said rectifier being installed at said supply substation; a switching center installed at said distribution substation, which, during the operational condition of the high-voltage network, connects said first overhead transmission line and said second overhead transmission line to said common busbar system of said distribution substation and, during deicing of the conductors of said second overhead transmission line, connects at least two conductors of said first overhead transmission line to three conductors of said second overhead transmission line, said switching center comprising:
- a three-phase set of switching apparatuses with individually controlled phases, which are on one side connected to said first overhead transmission line and on the other side are joined together in a common point;
- a single-phase switching apparatus connecting said common point to ground;
- a single-phase jumper connecting said common point to one of the conductors of said second overhead transmission line;
- a single-phase switching apparatus connecting two remaining conductors of said second overhead transmission line;
- a three-phase set of switching apparatuses connecting said first overhead transmission line to said common busbar system;

a three-phase set of switching apparatuses connecting said second overhead transmission line to said common busbar system.

23. A high-voltage network as claimed in claim 22, wherein said single-phase jumper connected to one of the conductors of said second overhead transmission line is connected via a single-phase switching apparatus.

* * * * *